(12) United States Patent
Wu et al.

(10) Patent No.: US 10,642,396 B2
(45) Date of Patent: May 5, 2020

(54) TOUCH DISPLAY PANEL AND DISPLAY DEVICE

(71) Applicant: WUHAN TIANMA MICRO-ELECTRONICS CO., LTD., Wuhan (CN)

(72) Inventors: Xiaoxiao Wu, Xiamen (CN); Guozhao Chen, Xiamen (CN)

(73) Assignee: WUHAN TIANMA MICRO-ELECTRONICS CO., LTD., Wuhan (CN)

( * ) Notice: Subject to any disclaimer, the term of this patent is extended or adjusted under 35 U.S.C. 154(b) by 76 days.

(21) Appl. No.: 16/147,586

(22) Filed: Sep. 29, 2018

(65) Prior Publication Data

US 2019/0034014 A1 Jan. 31, 2019

(30) Foreign Application Priority Data

Oct. 20, 2017 (CN) .......................... 2017 1 0985210

(51) Int. Cl.
*G06F 3/041* (2006.01)
*G06F 3/047* (2006.01)
*G06F 3/044* (2006.01)

(52) U.S. Cl.
CPC ............ *G06F 3/0412* (2013.01); *G06F 3/044* (2013.01); *G06F 3/047* (2013.01); *G06F 3/0416* (2013.01)

(58) Field of Classification Search
None
See application file for complete search history.

(56) References Cited

U.S. PATENT DOCUMENTS

| | | | |
|---|---|---|---|
| 2010/0073319 A1* | 3/2010 | Lyon | G06F 3/044 345/174 |
| 2016/0111040 A1* | 4/2016 | Kim | G02F 1/13454 345/698 |
| 2017/0249896 A1* | 8/2017 | Kim | G09G 3/3225 |
| 2018/0204889 A1* | 7/2018 | Yu | G09G 3/3233 |
| 2018/0308417 A1* | 10/2018 | Xie | G09G 3/3266 |
| 2019/0005915 A1* | 1/2019 | Liu | G02F 1/136286 |
| 2019/0073976 A1* | 3/2019 | Yeh | G02F 1/136286 |

\* cited by examiner

*Primary Examiner* — Nicholas J Lee
(74) *Attorney, Agent, or Firm* — Kilpatrick Townsend & Stockton, LLP

(57) ABSTRACT

Disclosed are a touch display panel and a display device, where the touch display panel includes a drive circuit, pixel elements arranged in an array, touch electrodes arranged in an array, and lead lines, where each of the touch electrodes is electrically connected with the drive circuit through at least one of the lead lines, the pixel elements include pixel element columns, and the touch electrodes include touch electrode columns, the quantity of lead lines is the same as the quantity of pixel element columns, and the lead lines are arranged uniformly in an area covered by a positive projection onto a first plane, a positive projection of each of the touch electrode columns onto the first plane covers the same quantity of lead lines.

20 Claims, 12 Drawing Sheets

TOUCH DISPLAY PANEL AND DISPLAY DEVICE

This application claims the benefit of Chinese Patent Applications No. 201710985210.4, filed with the Chinese Patent Office on Oct. 20, 2017, which is hereby incorporated by reference in its entirety.

FIELD

The present application relates to the field of display technologies, and particularly to a touch display panel and a display device.

BACKGROUND

A touch display panel is generally a regular rectangular display panel including a display area and a non-display area, and touch electrodes are connected with an Integrated Circuit (IC) through touch lead lines in the touch display panel; and in the display panel including the regular rectangular display area, the corresponding array of touch electrodes is a rectangle, and the touch lead lines can be arranged to be distributed uniformly in the touch display panel. As there is a demand for displaying throughout a screen of a display product, an image is required to be displayed in an abnormal shape on the panels of more and more products to thereby yield to their cameras, etc. However in a touch display panel on which an image is displayed in an abnormal shape, neither the shape of a display area, nor the shape of the corresponding array of touch electrodes is a rectangle, so that touch lead lines can not be distributed uniformly in the touch display panel, and thus an image may not be displayed uniformly in an abnormal shape on the touch display panel.

SUMMARY

Embodiments of the application provide a touch display panel and a display device so as to address the problem that the lead lines are not distributed uniformly so that an image is not displayed uniformly, and improve the quality of displaying the image, and the experience of a user.

An embodiment of the application provides a touch display panel including: a drive circuit, pixel elements arranged in an array, touch electrodes arranged in an array, and lead lines extending in a first direction, and arranged in a second direction, and each of the touch electrodes is electrically connected with the drive circuit through at least one of the lead lines. The pixel elements arranged in the array include pixel element columns, the touch electrodes arranged in the array include touch electrode columns, and both a column direction of the pixel element columns, and a column direction of the touch electrode columns are the first direction. The quantity of lead lines is the same as the quantity of pixel element columns, and the lead lines are arranged uniformly in an area covered by a positive projection onto a first plane. A positive projection of each of the touch electrode columns onto the first plane covers the same quantity of lead lines. The plurality of touch electrode columns include at least one first touch electrode column, and at least one second touch electrode column, and the quantity of touch electrodes in the first touch electrode column is more than the quantity of touch electrodes in the second touch electrode column; and the total quantity of lead lines electrically connected with the touch electrodes in each of the first touch electrode columns is equal to the total quantity of lead lines electrically connected with the touch electrodes in each of the second touch electrode columns; and the first direction intersects with the second direction, and the first plane is a plane where the touch display panel lies.

An embodiment of the application provides a display device including the touch display panel according to the embodiment of the application.

BRIEF DESCRIPTION OF THE DRAWINGS

In order to make the technical solutions according to the embodiments of the application more apparent, the drawings to which a description of the embodiments refers to will be introduced below in brief, and apparently the drawings to be described below are only some embodiments of the application.

DETAILED DESCRIPTION OF THE EMBODIMENTS

Figure 1:
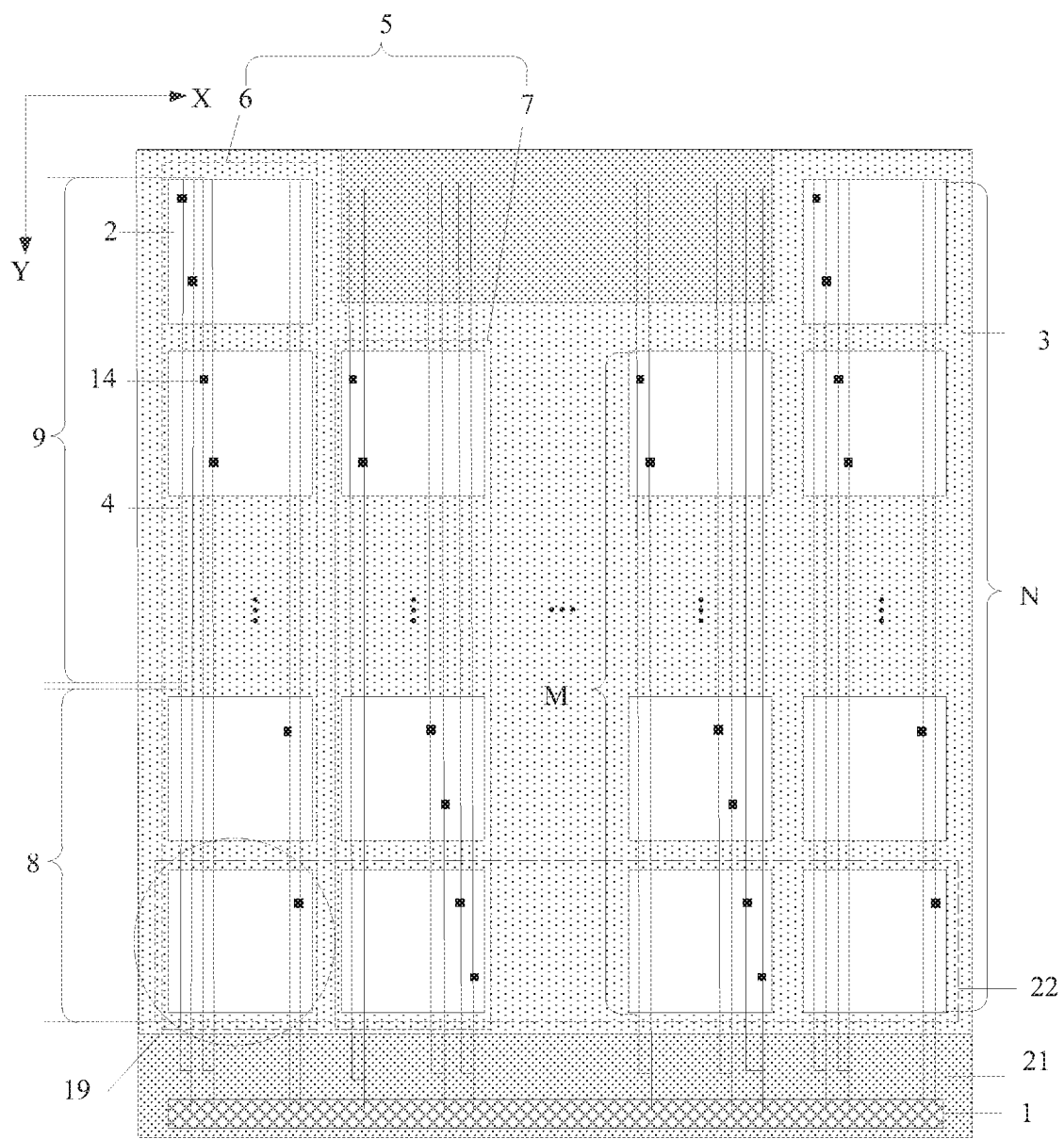
FIG. 1 is a schematic diagram of a touch display panel according to an embodiment of the application.
Figure 2:
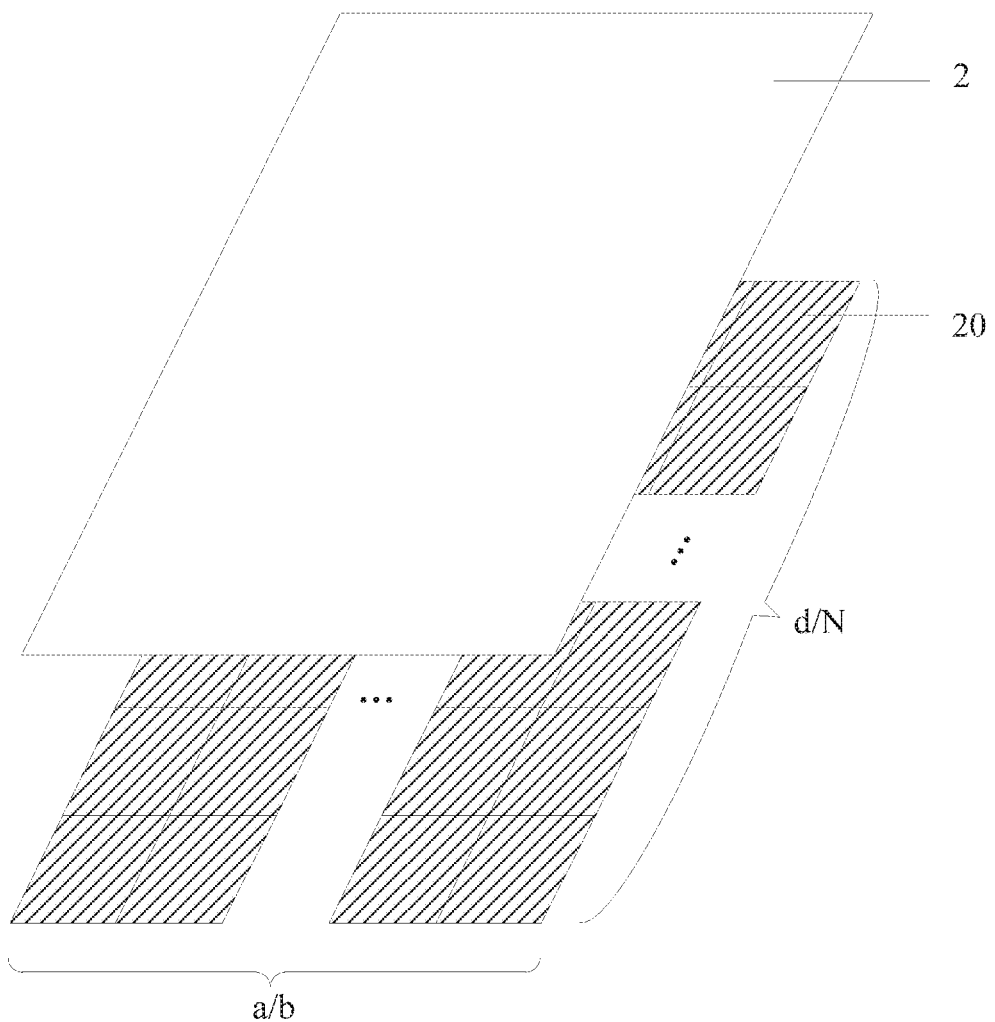
FIG. 2 is a schematic diagram of a magnified area 19 in FIG. 1 according to an embodiment of the application.

An embodiment of the application provides a touch display panel as illustrated in FIG. 1 and FIG. 2, where FIG. 1 is a schematic diagram of a touch display panel according to an embodiment of the application, and FIG. 2 is a schematic diagram of a magnified area 19 in FIG. 1. The touch display panel according to the embodiment of the application includes a display area 3, and a non-display area 21 surrounding the display area 3. In this embodiment, the shape of the touch display panel is a rectangle, where the shape of the display area 3 is not a rectangle, that is, the touch display panel according to the embodiment of the application is a touch display panel on which an image is displayed in an abnormal shape. The touch display panel as illustrated in FIG. 1 and FIG. 2 includes a drive circuit 1, pixel elements 20 arranged in an array, touch electrodes 2 arranged in an array, and lead lines 4 extending in a first direction Y. and arranged in a second direction X. In the touch display panel as illustrated in FIG. 1 and FIG. 2, the drive circuit 1 is arranged in the non-display area 21 of the touch display panel, both the touch electrodes in the array, and the pixel elements in the array are arranged in the display area 3 of the touch display panel, the touch electrodes in the array, and the pixel elements in the array are arranged opposite to each other in the direction perpendicular to a first plane, and the shape of each pixel element, and the shape of each touch electrode may be rectangles, where the first plane is the plane where the touch display panel lies, and the first plane is parallel to the plane where a pattern of the display area 3 lies.

The touch display panel in another embodiment of the application may be a Liquid Crystal Display (LCD), so each pixel element includes at least one sub-pixel defined by a scan line and a data line intersecting with each other, and the sub-pixel includes a pixel electrode, and a Thin Film Transistor (TFT) connected with the pixel electrode; and the touch electrodes are arranged opposite to the pixel electrodes in the direction perpendicular to the first plane. For example, a liquid crystal layer is arranged between the touch electrodes and the pixel electrodes, and a common electrode can be reused as the touch electrodes. The touch display panel can be an Organic Light-Emitting Diode (OLED) display panel, so each pixel element includes at least one sub-pixel defined by a scan line and a data line intersecting with each other, and each pixel element includes an OLED, a TFT controlling the OLED, etc. The drive circuit may include an IC, for example.

In the touch display panel as illustrated in FIG. 1 and FIG. 2 according to the embodiment of the application, each touch electrode 2 is electrically connected with the drive circuit 1 through at least one of the lead lines 4, where the lead line 4 is electrically connected with the touch electrode 2 in a connection area 4; the pixel elements arranged in an array include pixel element columns, and the touch electrodes arranged in an array include touch electrode columns 5, where both the column direction of a pixel element column, and the column direction of a touch electrode column are the first direction Y; and the touch display panel according to the embodiment of the application includes a columns of pixel element columns, d rows of pixel element rows, b columns of touch electrode columns 5, and N rows touch electrode rows 22. In this embodiment, both a and b are positive integers.

Each column of touch electrode column 5 corresponds to $$\frac{a}{b}$$

columns of pixel element columns, that is, a positive projection of each column of touch electrodes onto the first plane covers positive projections of $$\frac{a}{b}$$

columns of pixel element columns onto the first plane. Each touch electrode 2 corresponds to $$\frac{a}{b} \times \frac{d}{N}$$

pixel elements 20.

For example, the resolution of the touch display panel according to the embodiment of the application is 1080× 2160, that is, a=1080 and d=2160, the touch electrodes arranged in an array include 18 columns of touch electrode columns, and 31 rows of touch electrode rows, that is, b=18 and N=31, each touch electrode column corresponds to 60 columns of pixel element columns, and each touch electrode corresponds to 4180 pixel elements.

The quantity of lead lines 4 is the same as the quantity of pixel element columns, that is, the touch display panel according to the embodiment of the application includes a lead lines arranged uniformly in an area covered by the positive projection onto the first plane; and for example, the lead lines 4 can be arranged below the array of touch electrodes in an area overlapping with the area where the pixel elements 20 are arranged; and a positive projection of each touch electrode column 5 onto the first plane covers the same quantity of lead lines 4, that is, the positive projection of each touch electrode column 5 onto the first plane covers $$\frac{a}{b}$$

lead lines 4.

In one embodiment, a lead lines arranged uniformly refers to that there is a same distance between every two adjacent lead lines.

In one embodiment, the plurality of touch electrode columns 5 include at least one first touch electrode column 6, and at least one second touch electrode column 7, where the quantity of touch electrodes 2 in the first touch electrode column 6 is more than the quantity of touch electrodes 2 in the second touch electrode column 7.

In one embodiment, the touch electrodes are an array in the first direction Y and the second direction X, where the column direction is the first direction Y, and the row direction is the second direction X. The touch electrodes in the array include the first row of touch electrodes to the N-th row of touch electrodes arranged in sequence in the direction parallel to the first direction Y. and away from the drive circuit 1, where the touch electrodes 2 in the second touch electrode column 7 are only located in the first to M-th rows of touch electrodes, and M<N. The first touch electrode column 6 includes both touch electrodes 2 located in the first row of touch electrodes to the M-th row of touch electrodes, and at least touch electrodes 2 located in the (M+1)-th row of touch electrodes to the N-th row of touch electrodes. Stated otherwise, all the touch electrodes 2 in the (M+1)-th row of touch electrodes to the N-th row of touch electrodes are touch electrodes 2 in the first touch electrode column 6. In FIG. 1, N-M=1, for example, but N-M can be more than 1.

In one embodiment, the total quantity of lead lines 4 electrically connected with the touch electrodes 2 in each first touch electrode column 6 is equal to the total quantity of lead lines 4 electrically connected with the touch electrodes 2 in each second touch electrode column 7. It shall be noted that the total quantity of lead lines electrically connected with touch electrodes in any touch electrode column is the sum of the quantities of lead lines connected with the respective touch electrodes in the touch electrode column, where the first direction Y intersects with the second direction X, and in this embodiment, the first direction Y is orthogonal to the second direction X.

In the touch display panel according to the embodiment of the application, the touch electrodes are arranged in an array, there is a uniform spacing between adjacent rows of electrodes, the quantity of touch electrodes in the first touch electrode column is more than the quantity of touch electrodes in the second touch electrode column, and the length, of an area covered by a positive projection of the first touch electrode column onto the first plane, in the column direction is more than the length, of an area covered by a positive projection of the second touch electrode column onto the first plane, in the column direction, that is, the touch display panel according to the embodiment of the application is a touch display panel on which an image is displayed in an abnormal shape. For example, when second touch electrode columns are arranged between two first touch electrode columns, since the length, of an area covered by a positive projection of the second touch electrode column onto the first plane, in the column direction is less than the length, of an area covered by a positive projection of the first touch electrode column onto the first plane, in the column direction, an area where no touch electrode is arranged exists in an area, of a row of touch electrodes, intersecting with an area, of the second touch electrode column, extending in the column direction, and a camera or another element can be arranged in the area where no touch electrode is arranged, so that an image can be displayed throughout a screen of the touch display panel while yielding to the camera or the other element as required. Since the quantity of lead lines is the same as the quantity of pixel element columns, and the lead lines are arranged uniformly in the area covered by the positive projection onto the first plane, that is, in the touch display panel according to the embodiment of the application on which an image is displayed in an abnormal shape, the lead lines are distributed uniformly among the pixel elements in the array in the touch display panel, each pixel element column corresponds to one of the lead lines, one pixel element is considered as one light-emitting element, and each pixel element corresponds to one of the lead lines, so that there will be a uniform opening ratio of each pixel element to thereby improve the uniformity of displaying. Furthermore as compared with a pixel element corresponding to lead lines, in the touch display panel according to the embodiment of the application, the opening ratio and the transmittivity of a pixel element can be improved, and each touch electrode can be electrically connected with the drive circuit through at least one lead line, so that an image can be avoided from being displayed non-uniformly in an abnormal shape on the touch display panel due to the lead lines which are not arranged uniformly, while guaranteeing the precision of a touch on the touch display panel, to thereby display the image uniformly so as to improve the effect of displaying, and the experience of a user. In the touch display panel on which an image is displayed in an abnormal shape, the positive projection of each touch electrode column onto the first plane covers the same quantity of lead lines in the case that the lead lines are arranged uniformly in the area covered by the positive projection onto the first plane, so that the lead lines are distributed uniformly in the respective touch electrode columns, the total quantity of lead lines electrically connected with touch electrodes in each first touch electrode column is equal to the total quantity of lead lines electrically connected with touch electrodes in each second touch electrode column, and in a touch stage, in a display stage in the case that the common electrode is reused as the touch electrodes, or in another stage in which signals are provided through the lead lines, the quantity of lead lines for providing signals to touch electrodes in the first touch electrode column is the same as the quantity of lead lines for providing signals to touch electrodes in the second touch electrode column, so that the first touch electrode column, and the second touch electrode column are subjected to the same signal interference of the lead lines, thus improving the uniformity and the effect of displaying on the touch display panel, and also reducing the difference between the interference, of the signals transmitted on the lead lines, to the different touch electrode columns. Furthermore the arrangement patterns of the touch electrodes and the lead lines according to the embodiment of the application can be applicable to a touch display panel on which an image is displayed in an abnormal shape in a display area in any shape, so the touch display panel can be widely applied, and easy to fabricate.

It shall be noted that the touch electrode columns in the touch display panel are not all illustrated FIG. 1, the touch electrodes are not all illustrated in each touch electrode column, and the corresponding lead lines connected with the touch electrodes are not all illustrated. In FIG. 1, the touch electrodes 2 are electrically connected with two lead lines 4 and one lead line 4 respectively, or of course, the touch electrodes 2 can be connected with three or even more lead lines 4; and the quantities of lead lines 4 connected with each touch electrode 2 in the second touch electrode column 7 may or may not be the same. The quantity of lead lines 4 connected with each touch electrode 2 shall be determined according to the quantity of pixel element columns, and the quantity of touch electrode columns 5, in the touch display panel. The lead lines 4 can be connected with the touch electrodes 2 through through-holes, that is, the connection area 14 can include the through-holes. In FIG. 1, the first direction is the Y direction, and the second direction is the X direction, where the first direction Y is perpendicular to the second direction X. Of course, the first direction may be not perpendicular to the second direction, that is, the first direction and the second direction may be other directions intersecting with each other.

In one embodiment in the touch display panel as illustrated in FIG. 1 according to the embodiment of the application, respective lead lines 4 covered by a positive projection of the second touch electrode column 7 onto the first projection are electrically connected with touch electrodes 2 in the second touch electrode column 7. Since a positive projection of each touch electrode column 5 onto the first plane covers the same quantity of lead lines 4, and the total quantity of lead lines electrically connected with touch electrodes in each first touch electrode column is equal to the total quantity of lead lines electrically connected with touch electrodes in each second touch electrode column, that is, each lead line 4 covered by a positive projection of the first touch electrode column 6 onto the first plane is electrically connected with one of touch electrodes 2 in the first touch electrode column 6.

Accordingly in the touch display panel according to the embodiment of the application, since the quantity of lead lines is the same as the quantity of pixel element columns, the lead lines are arranged uniformly in the area covered by the positive projection onto the first plane, and a positive projection of each touch electrode column onto the first plane covers the same quantity of lead lines, that is, the lead lines are distributed uniformly in the pixel element columns, and the of touch electrode columns, each touch electrode column will be subjected to the same strength of interference of signals on the lead lines in the case that the uniformity and the effect of displaying on the touch display panel is improved. In a stage of providing signals through the lead lines, the lead lines may interfere the touch electrodes, both lead lines covered by the first touch electrode column, and lead lines covered by the second touch electrode column are connected with touch electrodes, that is, both the lead lines covered by the first touch electrode column, and the lead lines covered by the second touch electrode column provide the touch electrodes with signals, the quantity of lead lines for providing signals for the touch electrodes in the first touch electrode column is the same as the quantity of lead lines for providing signals for the touch electrodes in the second touch electrode column, and each touch electrode is subjected to interference of the same quantity of lead lines, so that the interference of the lead lines to the touch electrodes in the first touch electrode column, and the second touch electrode column is distributed uniformly; in a stage of providing the touch electrodes with touch signals through the lead lines, interference of the lead lines to each touch electrode is distributed uniformly, so that the precision of a touch on the touch display panel can be improved; and when the common electrode is reused as the touch electrodes, interference of lead lines to each touch electrode is distributed uniformly in a display stage, so that the effect of displaying on the touch display panel can be improved. Furthermore since the quantity of touch electrodes in the first touch electrode column is more than the quantity of touch electrode in the second touch electrode column, and the total quantity of lead lines electrically connected with touch electrodes in each first touch electrode column is equal to the total quantity of lead lines electrically connected with touch electrode in each second touch electrode column, when the lead lines corresponding to the second touch electrode columns are allocated uniformly for the touch electrodes in the respective second touch electrode columns, no matter how the lead lines are allocated for the touch electrodes in the first touch electrode column, the first touch electrode column is sure to include a touch electrode connected with lead lines, the quantity of which is less than the quantity of lead lines connected with each touch electrode in the second touch electrode column, that is, the first touch electrode column includes a touch electrode connected with a different quantity of lead lines from the quantity of lead lines connected with a touch electrode in the second touch electrode column; and the respective lead lines covered by the positive projection of the second touch electrode column onto the first plane are connected with the touch electrodes in the second touch electrode column, and as compared with the case that lead lines corresponding to the second touch electrode column include a lead line which is not connected with any touch electrode, the first touch electrode column, and the second touch electrode column can be connected with as many lead lines as possible, so that each touch electrode in a touch electrode column can be connected with as many lead lines as possible, and in this way, even if the first touch electrode column includes a touch electrode connected with a different quantity of lead lines from the quantity of lead lines connected with a touch electrode in the second touch electrode column, then as compared with the case that each touch electrode is connected with a smaller quantity of lead lines, each touch electrode can be connected with as many lead lines as possible to thereby reduce the difference between the quantity of lead lines connected with a touch electrode in the first touch electrode column, and the quantity of touch electrodes connected with a touch electrode in the second touch electrode column so as to reduce the difference between signals transmitted on the lead lines arising from the difference between the quantities of lead lines connected with the touch electrodes in the different touch electrode columns. Moreover respective lead lines covered by positive projections of the first touch electrode column, and the second touch electrode column onto the first plane are connected with the touch electrodes, so that the lead lines can be made full use of, that is, the lead lines covered by the positive projections of the first touch electrode column, and the second touch electrode column onto the first plane can be arranged uniformly without arranging any additional lead lines, so that the lead lines can be arranged uniformly in the area covered by the positive projection onto the first plane to thereby display an image uniformly, and make a normal touch on the touch electrodes so as to guarantee the precision of a touch on the touch display panel.

It shall be noted that the lead lines according to the embodiments of the application include touch lead lines for connecting the touch electrodes with the drive circuit, and can further include dummy lines which are not connected with the touch electrodes and the drive circuit, whether to set the dummy lines can be determined dependent upon a real condition. Respective lead lines covered by a positive projection of the second touch electrode column onto the first plane are electrically connected with touch electrodes in the second touch electrode column, that is, there is no need to arrange the dummy lines in the area covered by the positive projection of the second touch electrode column onto the first plane, and correspondingly since the total quantity of lead lines electrically connected with touch electrodes in the first touch electrode column is equal to the total quantity of lead lines electrically connected with touch electrodes in the second touch electrode column, respective lead lines covered by a positive projection of the first touch electrode column onto the first plane are electrically connected with the respective touch electrodes in the first touch electrode column, that is, there is also no need to arrange the dummy lines in the area covered by the positive projection of the first touch electrode column onto the first plane. Stated otherwise, when the touch display panel only includes the first touch electrode column, and the second touch electrode column, no dummy lines are needed to be arranged in the touch display panel to make the quantity of lead lines the same as the quantity of pixel element columns.

In one embodiment, each of the lead lines covered by a positive projection of the second touch electrode column onto the first plane is electrically connected with at least one of touch electrodes in the second touch electrode column, and furthermore, the respective touch electrodes in the second touch electrode column are electrically connected with the same quantity of lead lines, so that lead lines covered by a positive projection of each second touch electrode column onto the first plane are allocated uniformly for respective touch electrodes in the second touch electrode column, that is, a signal is transmitted to each touch electrode in the second touch electrode column through the same quantity of lead lines, so that the uniformity and the effect of displaying on the touch display panel can be improved, and the difference in interference, of the signals transmitted on the lead lines, to the different touch electrode columns can be reduced, but also the difference in signals transmitted on the lead lines arising from different numbers of lead lines connected with the touch electrodes in the touch electrode column can be further reduced, and the lead lines covered by the positive projection of the second touch electrode column onto the first plane can be arranged uniformly without arranging any additional lead lines, so that the uniformity of the precision of a touch on the touch display panel can be improved while making a normal touch on the touch electrodes.

In one embodiment, at least one touch electrode in the first touch electrode column is electrically connected with a different quantity of lead lines from the quantities of lead lines electrically connected with the other touch electrodes in the first touch electrode column; and respective touch electrodes in the second touch electrode column are electrically connected with the same quantity of lead lines.

When the touch display panel includes a columns of touch element columns, and b columns of touch electrode columns, each second touch electrode column includes c touch electrodes, and respective lead lines covered by a positive projection of the second touch electrode column onto the first plane are electrically connected with touch electrodes in the second touch electrode column, if touch electrodes in each second touch electrode column are electrically connected with n lead lines, then $$n \times c = \frac{a}{b}.$$

In the touch display panel as illustrated in FIG. 1 according to the embodiment of the application each touch electrode 2 in the second touch electrode column 7 is connected with two lead lines 4, and in the first touch electrode column 6, the two touch electrodes 2 closest to the drive circuit 1 are connected respectively with one lead line 4, and the other touch electrodes 2 are each connected with two lead lines 4, so that the total quantity of lead lines 4 electrically connected with the touch electrodes 2 in the first touch electrode column 6 is equal to the total quantity of lead lines 4 electrically connected with the touch electrodes 2 in the second touch electrode column 7. In FIG. 1 when the second touch electrode column 7 includes c touch electrodes, a positive projection of each touch electrode column 5 onto the first plane covers $$\frac{a}{b}$$

lead lines, where $$2 \times c = \frac{a}{b},$$

and n and c are positive integers. For example, the resolution of the touch display panel according to the embodiment of the application is 1080×2160, that is, a=1080 and d=2160; the touch electrodes arranged in an array include 18 columns of touch electrode columns, and 31 rows of touch electrode rows, that is, b=18 and N=31; and a positive projection of each touch electrode column onto the first plane covers 60 lead lines, each second touch electrode column includes 30 touch electrodes, and touch electrodes in each second touch electrode column are electrically connected respectively with 2 lead lines, that is, c=30 and n=2.

In the touch display panel according to the embodiment of the application, the quantity of touch electrodes in the first touch electrode column is more than the quantity of touch electrodes in the second touch electrode column, the length of the first touch electrode column in the column direction is more than the length of the second touch electrode column in the column direction, and for the first touch electrode column, and the second touch electrode column, the respective touch electrodes in the second touch electrode column are electrically connected with the same quantity of lead lines, and at least one touch electrode in the first touch electrode column is electrically connected with a different quantity of lead lines from the quantities of lead lines electrically connected with the other touch electrodes in the first touch electrode column. Furthermore since the total quantity of lead leads electrically connected with touch electrodes in each first touch electrode column is equal to the total quantity of lead lines electrically connected with touch electrodes in each second touch electrode column, in a stage of providing signals through the lead lines, there is a significant difference between loads corresponding to the lead lines connected with the first touch electrodes arranged, in the first touch electrode column, and the second touch electrode column, in the column direction, and in the direction facing the drive circuit, and there is a significant total difference between loads corresponding to lead lines connected with a touch electrode in the first touch electrode column, and loads corresponding to lead lines connected with a corresponding touch electrode in the second touch electrode column. When a touch electrode is connected with a different quantity of lead lines, there is also a different load corresponding to the lead lines connected with the touch electrode, and in the touch display panel according to the embodiment of the application, at least one touch electrode in the first touch electrode column is electrically connected with a different quantity of lead lines from the quantities of lead lines electrically connected with the other touch electrodes in the first touch electrode column, so that by making the quantities of the lead lines connected with respective touch electrodes in the same touch electrode column are not all the same, to thereby reduce the difference between loads corresponding to lead lines connected with touch electrodes in different types of touch electrode columns in the stage of providing signals through the lead lines, so as to reduce the total difference between loads corresponding to lead lines connected with a touch electrode in the first touch electrode column, and loads corresponding to lead lines connected with a touch electrode in the second touch electrode column, thus further improving the precision of a touch on the touch display panel in the case that the uniformity and the effect of displaying on the touch display panel is improved, and the difference between interference, of the signals transmitted on the lead lines, to the different touch electrode columns is reduced.

In one embodiment, the largest quantity of lead lines electrically connected with any one touch electrode in the first touch electrode column is equal to the quantity of lead lines electrically connected with each touch electrode in the second touch electrode column, that is, the quantity of lead lines electrically connected with any one touch electrode in the first touch electrode column is not more than the quantity of lead lines electrically connected with each touch electrode in the second touch electrode column. As illustrated in FIG. 1, each touch electrode 2 in the second touch electrode column 7 is electrically connected with two lead lines 4, so any one touch electrode 2 in the first touch electrode column 6 is electrically connected with at least two lead lines 4.

In one embodiment, the first touch electrode column includes a first type of touch electrodes, and a second type of touch electrodes, where the quantity of lead lines electrically connected with each of the first type of touch electrodes is less than the quantity of lead lines electrically connected with each of the second type of touch electrodes, and the quantity of lead lines electrically connected with each of the second type of touch electrodes is the same as the quantity of lead lines electrically connected with each touch electrode in the second touch electrode column; the first type of touch electrodes are closer to the drive circuit than the second type of touch electrodes in the extension direction of the lead lines; and as can be appreciated, the first type of touch electrodes being closer to the drive circuit than the second type of touch electrodes can refer to signals provided by the drive circuit being transmitted to the first type of touch electrodes over a shorter path than the second type of touch electrodes.

In one embodiment as illustrated in FIG. 1, the first touch electrode column 6 includes two first type of touch electrodes 8 and second type of touch electrodes 9, where the two first type of touch electrodes 8 are proximate to the drive circuit 1, and the plurality of second type of touch electrodes 9 are away from the drive circuit 1. In the touch display panel according to the embodiment of the application, the quantity of leads is the same as the quantity of pixel element columns, the lead lines are arranged uniformly in the area covered by the positive projection onto the first plane, the respective touch electrodes in the first touch electrode column, and the second touch electrode column are connected with the same quantity of lead lines, and the respective lead lines covered in the area covered by the positive projection of the second touch electrode column onto the first plane are connected with the touch electrodes, so that the quantity of lead lines connected with the second type of touch electrode is equal to the quantity of lead lines connected with each touch electrode in the second touch electrode column. In this way, there is no difference between the quantity of lead lines connected with the second type of touch electrode, and the quantity of lead lines connected with each touch electrode in the second touch electrode column, and the quantity of lead lines connected with the first type of touch electrode is less than the quantity of lead lines connected with each touch electrode in the second touch electrode column; and the quantity of lead lines connected with the touch electrode proximate to the drive circuit is less than the quantity of lead lines connected with the touch electrode away from the drive circuit, so that the ratio of the largest one of the resistances of the lead lines connected with the touch electrodes in the first touch electrode column to the smallest one of the resistances of the lead lines connected with the touch electrodes in the first touch electrode column can be reduced, and in this way, in the case that the uniformity and the effect of displaying on the touch display panel is improved, and the difference between interference, of the signals transmitted on the lead lines, to the different touch electrode columns is reduced, the lead lines corresponding to the first touch electrode column can be allocated reasonably to thereby reduce the difference in impedance between the different touch electrodes in the first touch electrode column so as to further improve the precision of a touch on the touch display panel. The lead lines 4 connected with the same second type of touch electrode 9 are connected with the drive circuit 1 through a connection line after being connected in parallel.

In one embodiment, in the touch display panel as illustrated in FIG. 1 according to the embodiment of the application, each of the first type of touch electrodes 8 is electrically connected with the same quantity of lead lines 4. Furthermore the quantity of lead lines 4 connected with the first type of touch electrode 8 is less than the quantity of lead lines 4 connected with the second type of touch electrode 9 by one, and in the touch display panel according to the embodiment of the application, the quantity of lead lines is the same as the quantity of the pixel element columns, the lead lines are arranged uniformly in the area covered by the positive projection onto the first plane, the first touch electrode column and the second touch electrode column are connected with the same quantity of lead lines, and the respective lead lines covered in the area covered by the positive projection of the second touch electrode column onto the first plane are connected with the touch electrodes, so that the quantity of lead lines connected with the second type of touch electrode is equal to the quantity of lead lines connected with each touch electrode in the second touch electrode column, and the quantity of lead lines connected with the first type of touch electrode is less than the quantity of lead lines connected with each touch electrode in the second touch electrode column, and thus the difference between the quantity of lead lines connected with the first type of touch electrode, and the quantity of lead lines connected with the second type of touch electrode can be reduced as many as possible to thereby reduce the difference between the first type of touch electrode, and the second type of touch electrode, in each first touch electrode column, here the difference generally refers to the difference between the amplitudes of touch signals, provided by the drive circuit, received by the first type of touch electrode, and the second type of touch electrode, so the precision of a touch on the touch display panel can be further improved in the case that the uniformity and the effect of displaying on the touch display panel is improved, and the difference between interference, of the signals transmitted on the lead lines, to the different touch electrode columns is reduced.

Furthermore in the touch display panel as illustrated in FIG. 1 according to the embodiment of the application, each first type of touch electrode 8 is connected with one lead line 4, that is, in the case that the quantity of lead lines is the same as the quantity of pixel element columns, the lead lines are arranged uniformly in the area covered by the positive projection onto the first plane, the first touch electrode column and the second touch electrode column are connected with the same quantity of lead lines, and the respective lead lines covered in the area covered by the positive projection of the second touch electrode column onto the first plane are connected with the touch electrodes, each first type of touch electrode is connected with one lead line, the second type of touch electrode is connected with two lead lines, and each touch electrode in the second touch electrode column is connected with two lead lines, so that a positive projection of a touch electrode column onto the first plane covers a smaller quantity of lead lines while the uniformity and the effect of displaying on the touch display panel is improved, and the difference between interference, of the signals transmitted on the lead lines, to the different touch electrode columns is reduced, and in this way, the touch electrodes can be connected with the lead lines in a sufficient area to thereby operate normally so as to guarantee the precision of a touch on the touch display panel, and a production cost can be saved. In FIG. 1, each touch electrode 2 in the second touch electrode column 7 is electrically connected with two lead lines 4, and the first touch electrode column 6 includes one more touch electrode than the second touch electrode column 7, so two first type of touch electrodes 8 electrically connected respectively with one lead line 4 shall be arranged in the first touch electrode column 6, the other second type of touch electrodes 9 each is electrically connected with two lead lines 4, and the total quantity of lead lines 4 electrically connected with the touch electrodes 2 in the first touch electrode column 6 is equal to the total quantity of lead lines 4 electrically connected with the touch electrodes 2 in the second touch electrode column 7, so that the quantity of lead lines 4 is equal to the quantity of pixel element columns, and the lead lines 4 are arranged uniformly in the area covered by the positive projection onto the first plane, thus displaying an image uniformly.

In a design of the touch display panel, when each of the second type of touch electrodes is connected with the same quantity of lead lines, the difference between the quantity of lead lines connected with a second type of touch electrode, and the quantity of lead lines connected with a first type of touch electrodes can be more than one, and shall be designed according to the quantity of lead lines covered by a positive projection of each touch electrode column onto the first plane, and the quantity of touch electrodes in the first touch electrode column.

The touch display panel as illustrated in FIG. 1 and FIG. 2 according to the embodiment of the application includes a columns of pixel element columns, d rows of pixel element rows, b columns of touch electrode columns 5, and N rows of touch electrode rows, where the b columns of touch electrode columns 5 include two columns of the first touch electrode columns 6, and (b−2) columns of the second touch electrode columns 7. Where the second touch electrode column 7 includes c touch electrodes 2, the first touch electrode column 6 includes (c+1) touch electrodes 2, each touch electrode 2 in the second touch electrode column 7 is connected with two lead lines 4, and the first touch electrode column 6 includes two first type of touch electrodes 8 connected respectively with one lead line 4, and second type of touch electrodes 9 connected respectively with two lead lines 4, that is, the touch display panel includes (c*b+2) touch electrodes 2, and the (c*b+2) touch electrodes 2 are connected with 2c*b lead lines 4 in total, where 2c*b=a, that is, the quantity of lead lines 4 is the same as the quantity of pixel element columns. Furthermore the lead lines 4 are arranged uniformly in the area covered by the positive projection onto the first plane, that is, each lead line 4 corresponds to one of the pixel element columns, and the respective lead lines 4 are arranged uniformly in the touch display panel according to the embodiment of the application; and each pixel element column corresponds to one of the lead lines 4, that is, each pixel element 20 corresponds to one of the lead lines 4, so that there will be a uniform opening ratio of each pixel element 20 to thereby improve the uniformity of displaying so as to display an image uniformly, to improve the effect of displaying an image in an abnormal shape, and to improve the experience of a user.

In the touch display panel as illustrated in FIG. 1 according to the embodiment of the application, different first type of touch electrodes 8 in the same touch electrode column 5 are connected with the same quantity of lead lines 4, or of course, in another embodiment of the application, different first type of touch electrodes in the same first touch electrode column may be connected with different quantities of lead lines, and in this case, the quantity of lead lines connected with the first type of touch electrode in the same first touch electrode column is not more than the quantity of lead lines connected with the first type of touch electrode adjacent to the first type of touch electrode on the side away from the drive circuit.

Figure 3:
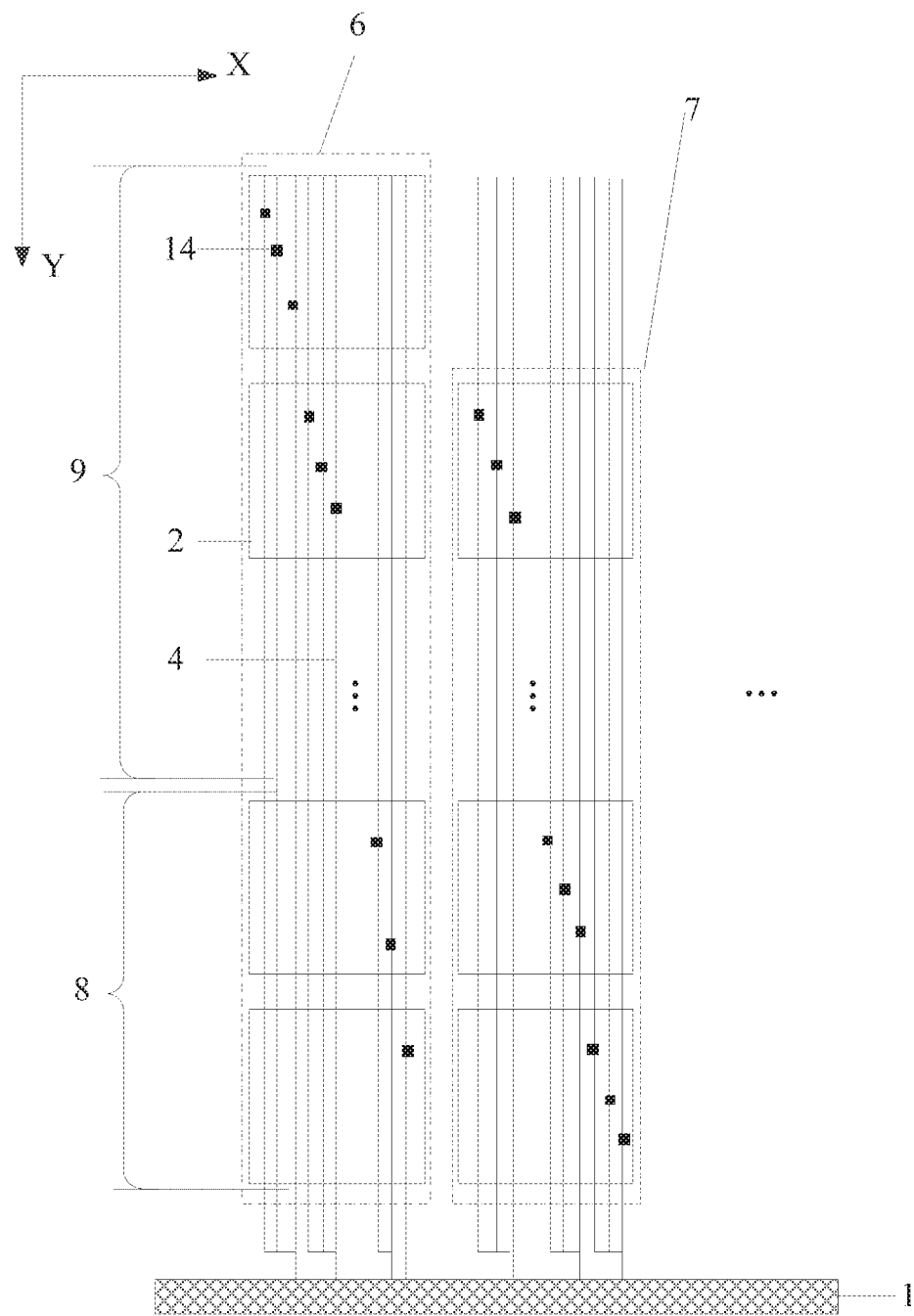
FIG. 3 is a schematic diagram of another touch display panel according to an embodiment of the application.

Another touch display panel according to an embodiment of the application is as illustrated in FIG. 3 which is a schematic diagram of another touch display panel according to the embodiment of the application. The touch display panel as illustrated in FIG. 3 includes a drive circuit 1, touch electrodes 2 arranged in an array, and lead lines 4 extending in a first direction Y. and arranged in a second direction X, where the touch electrodes arranged in an array includes touch electrode columns, the plurality of touch electrode columns include at least one first touch electrode column 6, and at least one second touch electrode column 7, each touch electrode 2 in the second touch electrode column 7 is electrically connected with three lead lines 4, and each of the lead lines 4 covered by a positive projection of the second touch electrode column 7 onto a first plane is electrically connected with the touch electrodes 2 in the second touch electrode column 7, and the first touch electrode column 6 includes second type of touch electrodes 9 each electrically connected with three lead lines 4, one first type of touch electrode 8 electrically connected with two lead lines 4, and one first type of touch electrode 8 electrically connected with one lead line 4, where the first type of touch electrode 8 electrically connected with one lead line 4 is closer to the drive circuit 1 than the first type of touch electrode 8 electrically connected with two lead lines 4, so that the difference in resistance between the lead lines can be reduced, and the quantity of lead lines 4 is equal to the quantity of pixel element columns, and the lead lines 4 are arranged uniformly in the area covered by the positive projection onto the first plane, so that an image can be displayed uniformly.

In the touch display panel as illustrated in FIG. 1 and FIG. 3, a lead line(s) 4 connected with the first type of touch electrode 8 is or are arranged on one side of lead lines 4 connected with the second type of touch electrode 9 along the X direction.

in another embodiment of the application, a lead line(s) connected with the first type of touch electrode in the same first touch electrode column is or are arranged between lead lines connected with second type of touch electrodes in the touch electrode column.

Figure 4:
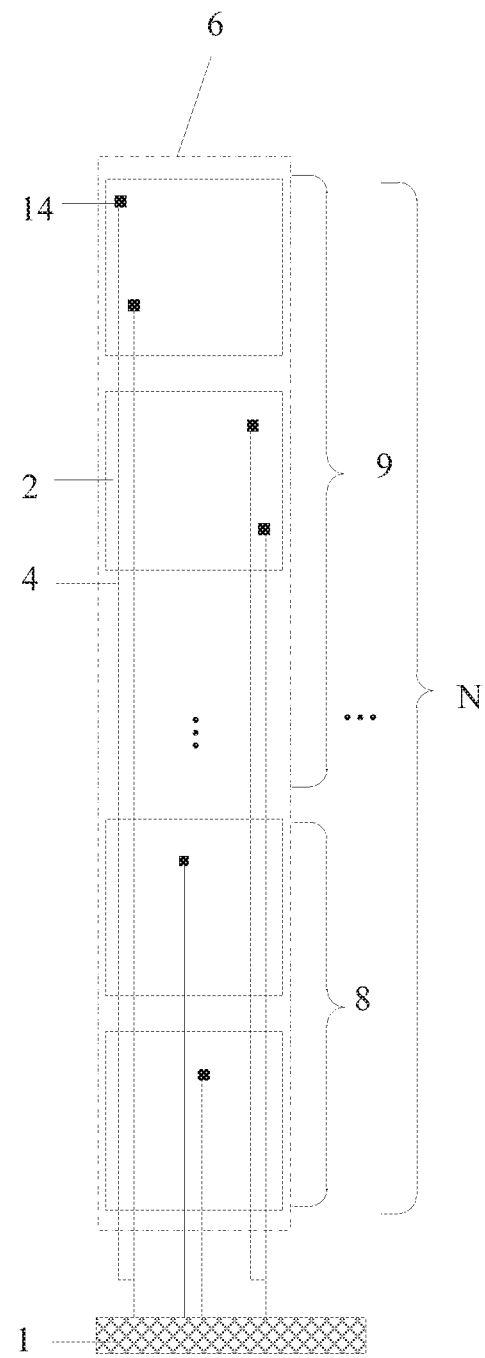
FIG. 4 is a schematic diagram of arranged lead lines of the first touch electrode column in a touch display panel according to an embodiment of the application.

In one embodiment as illustrated in FIG. 4 which is a schematic diagram of a touch display panel according to an embodiment of the application, in an example in which the first touch electrode column 6 include two first type of touch electrodes 8, and (N−2) second type of touch electrodes 9, lead lines 4 connected with the two first type of touch electrodes 8 are arranged between lead lines 4 connected with the first second type of touch electrode 9, and lead lines 4 connected with the second second type of touch electrode 9 in the column direction facing the drive circuit.

In one embodiment, the distance between any one lead line connected with the first type of touch electrode in the same first touch electrode column, and the symmetry axis of the touch electrode column is not shorter than the distance between a lead line connected with the second type of touch electrode in the touch electrode column, and the symmetry axis of the touch electrode column.

Also a normal touch on the touch electrodes can be made, the precision of a touch on the touch display panel can be guaranteed, and the lead lines covered by the positive projection of the second touch electrode column onto the first plane can be arranged uniformly without arranging any additional lead lines, so that an image can be displayed uniformly.

In the touch display panel according to the embodiment of the application, in the case that the quantity of lead lines is the same as the quantity of pixel element columns, the lead lines are arranged uniformly in the area covered by the positive projection onto the first plane, the first touch electrode column and the second touch electrode column are connected with the same quantity of lead lines, and the respective lead lines covered in the area covered by the positive projection of the second touch electrode column onto the first plane are connected with the touch electrodes, since the quantity of leads connected with the first type of touch electrode in any one first touch electrode column is less than the quantity of leads connected with the second type of touch electrode, the capacity for transmitting a signal of the second type of touch electrode is higher than the capacity for transmitting a signal of the first type of touch electrode; and in the embodiment of the application, the lead lines connected with the first type of touch electrode are arranged between the lead lines connected with the second type of touch electrodes, and the lead lines connected with the first type of touch electrode are closer to the symmetry axis of the touch electrode column than the lead lines connected with the second type of touch electrodes, so that the first type of touch electrode can be connected with the lead lines in a sufficient area, and in this way, the first type of touch electrode can operate normally in a stage of providing a signal for the touch electrode through the lead lines, so the difference between the amplitudes of touch signals, provided by the drive circuit, received by the different touch electrodes can be further reduced in the case that the uniformity and the effect of displaying on the touch display panel is improved, and the difference between interference, of the signals transmitted on the lead lines, to the different touch electrode columns is reduced, to thereby improve the precision of a touch on the touch display panel while displaying an image uniformly.

The respective touch display panels as illustrated in FIG. 1 to FIG. 4 according to the embodiments of the application have been described by way of an example in which the touch electrodes are rectangular touch electrodes, but in another embodiment of the application, the touch display panel can include non-rectangular touch electrodes.

Figure 5:
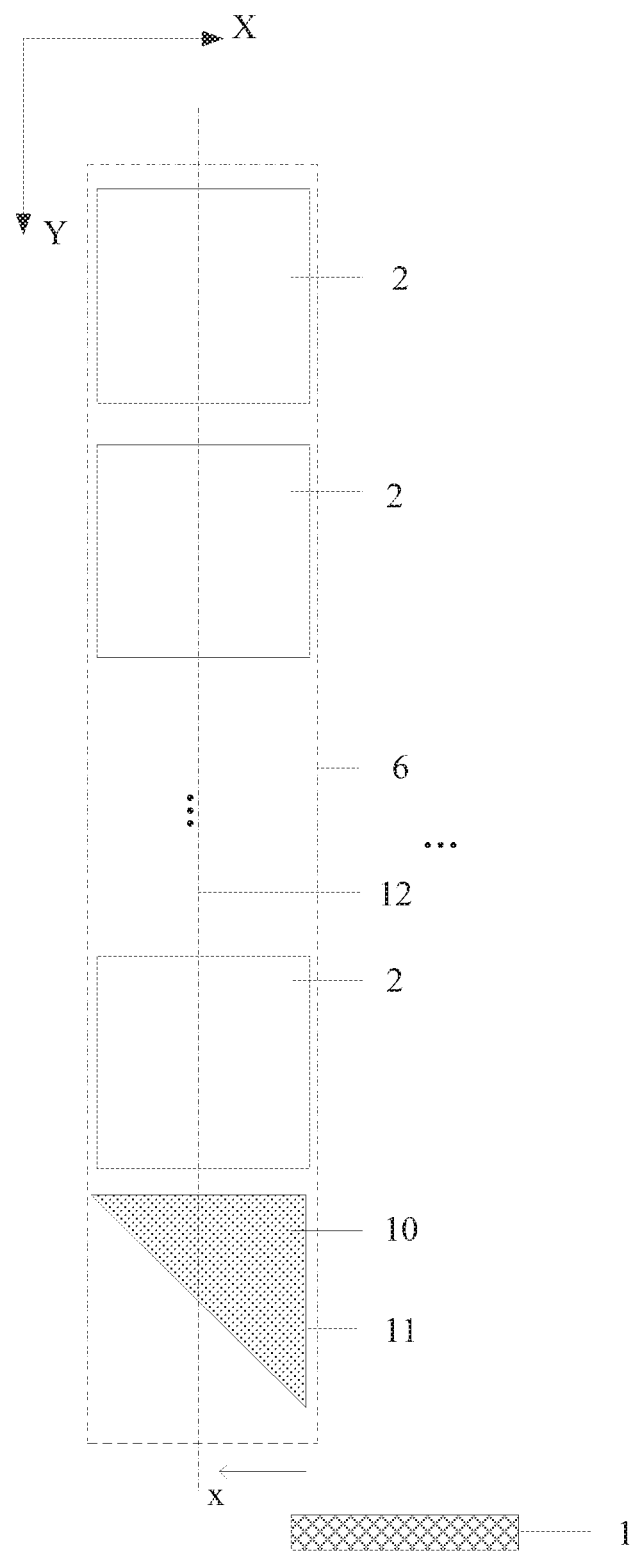
FIG. 5 is a schematic diagram of another touch display panel according to an embodiment of the application.

Still another touch display panel according to an embodiment of the application is as illustrated in FIG. 5 which is a schematic diagram of the touch display panel according to the embodiment of the application including an array of touch electrodes including non-rectangular touch electrodes, and in the touch display panel according to the embodiment of the application, such a first type of touch electrode in at least one first touch electrode column 6 that is adjacent to a drive circuit 1 in a first direction Y is a non-rectangular touch electrode 10.

Figure 6:
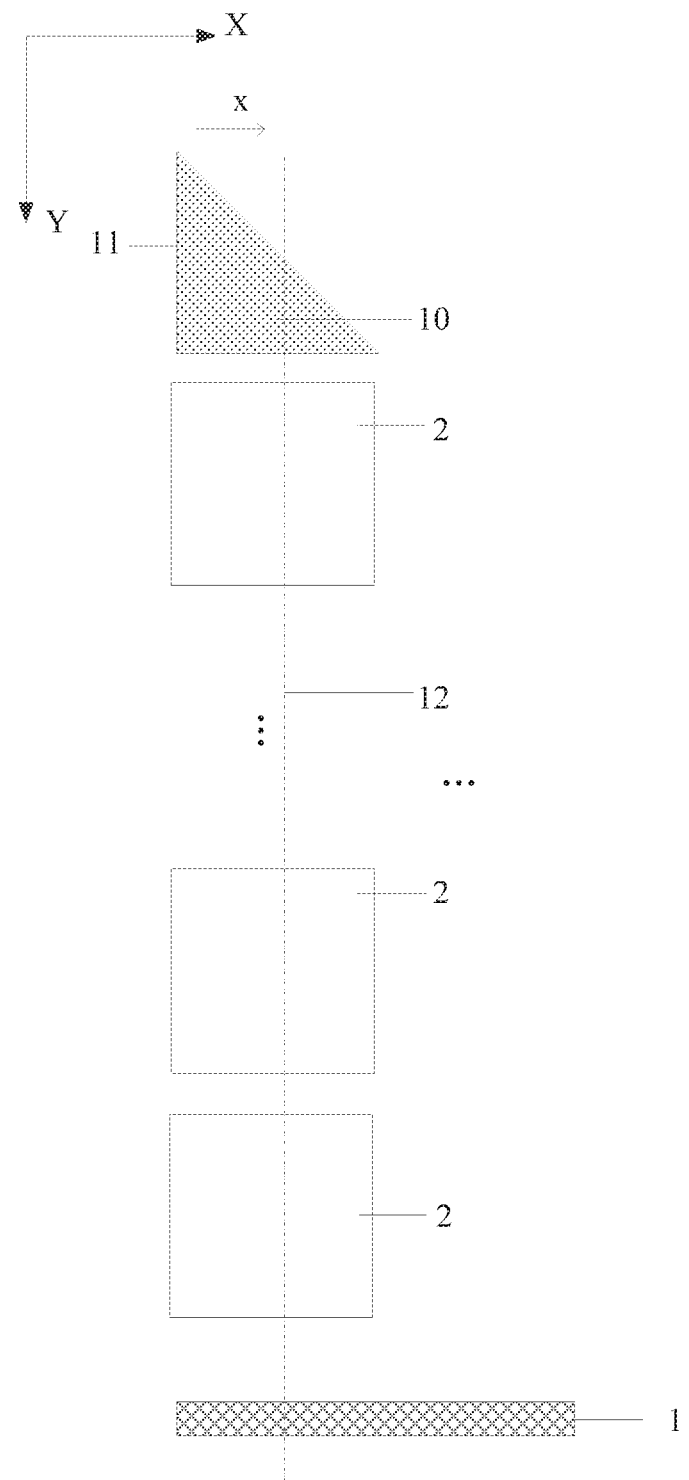
FIG. 6 is a schematic diagram of another touch display panel according to an embodiment of the application.

A further touch display panel according to an embodiment of the application is as illustrated in FIG. 6 which is a schematic diagram of the touch display panel according to the embodiment of the application including an array of touch electrodes including non-rectangular touch electrodes, and in the touch display panel according to the embodiment of the application, at least one touch electrode column includes rectangular touch electrodes and one non-rectangular touch electrode 10, and the non-rectangular touch electrode 10 is farther from a drive circuit 1 in a first direction Y as compared with a rectangular touch electrode. The touch electrode column in FIG. 6 can be a first touch electrode column, or can be a second touch electrode column.

In the touch display panel according to the embodiment of the application on which an image is displayed in an abnormal shape, the lead lines are distributed uniformly among the pixel element columns and the touch electrode columns, and when two adjacent touch electrode columns include different numbers of touch electrodes, and the lengths, of areas covered by their positive projections onto the first plane, in the column direction are different, the non-rectangular touch electrode can be arranged in the touch electrode column for the purpose of the transition of a pattern of the touch electrodes to thereby make full use of a display area and a touch area so as to further improve the precision of a touch on the touch display panel while improving the uniformity and the effect of displaying on the touch display panel, and reducing the difference in interference of the signals, transmitted on the lead lines, to the different touch electrode columns.

The respective touch display panels as illustrated in FIG. 5 and FIG. 6 according to the embodiments of the application have been described by way of an example in which the shape of the non-rectangular touch electrode 12 is a triangle, or of course, the non-rectangular touch electrode 12 can be in another shape, e.g., a trapezium with a bottom side parallel to the first direction Y.

In one embodiment, the touch electrodes include first sides parallel to the first direction, and the first sides of the touch electrodes in the same touch electrode column lie on the same straight line; and the first side of the non-rectangular touch electrode is of the largest length of the non-rectangular touch electrode in the first direction, and the length of the non-rectangular touch electrode in the first direction decreases progressively in a third direction, where the third direction is the direction parallel to the second direction and pointed from the first side to a first symmetry axis, where the first symmetry axis is a symmetry axis about which the rectangular touch electrodes in the same touch electrode column, as the non-rectangular touch electrode extend in the first direction. In the touch display panels as illustrated in FIG. 5 and FIG. 6 according to the embodiments of the application, the first side of the non-rectangular touch electrode 10 is the right-angled side 11 of the non-rectangular touch electrode 12 in the first direction, and the third direction x is the direction from the right-angled side 11 to the first symmetry axis 12; and since the first side of the non-rectangular touch electrode 10 lies respectively on two sides of the first symmetry axis 12 in the first direction, the third direction x in FIG. 5 is opposite to the third direction x in FIG. 6. For the same touch display panel, when the touch display panel includes non-rectangular touch electrodes 10, since the shapes and the positions of the non-rectangular touch electrodes 10 may be different, and even the positions, of the first sides of the respective non-rectangular touch electrodes 10, on the first symmetry axis 12 may also be different, the third directions x of the different non-rectangular touch electrodes 10 in the same touch display panel may be different.

Figure 7:
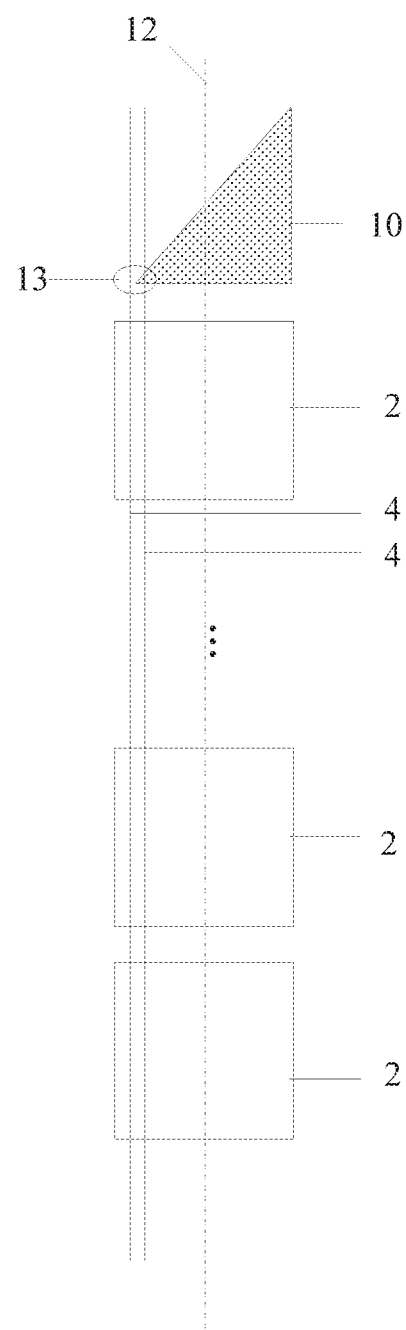
FIG. 7 is a schematic diagram of an example in which no lead line can be connected with a non-rectangular touch electrode.

It shall be noted that in the touch display panel as illustrated in FIG. 1 according to the embodiment of the application, the second direction X is the direction from the left to the right, and for any one touch electrode column 5, the lead lines 4 are arranged from the left to the right, and connected in sequence with the first touch electrode 2 to the last touch electrode 2 in the column direction, that is, the leftmost lead line 4 is connected with the first touch electrode 2 in the column direction, and the rightmost lead line 4 is connected with the last touch electrode 2 in the column direction. However when the touch display panel includes non-rectangular touch electrodes, as illustrated in FIG. 7 which is a schematic diagram of an example in which no lead line can be connected with the non-rectangular touch electrode. Since the lead lines 4 shall be arranged uniformly in the first plane in the touch display panel according to the embodiment of the application, if the lead lines 4 are still arranged from the left to the right, and connected in sequence with the first touch electrode 2 to the last touch electrode 2 in the column direction, then such a case may occur that the area of the non-rectangular touch electrode 10 in the area 13 is so small that two lead lines 4 as illustrated can not be electrically connected with the non-rectangular touch electrode 10, so that the non-rectangular touch electrode 10 can not operate normally, and thus the precision of a touch on the touch display panel can not be improved while making full use of the touch area.

In another implementation of the embodiment of the application, when a touch electrode column includes a non-rectangular touch electrode, among lead lines electrically connected with touch electrodes in the touch electrode column, the distance between a connection area of any other lead line than lead lines electrically connected with a touch electrode adjacent to the drive circuit, and the drive circuit is not shorter than the distance between a connection area of a lead line adjacent to the any other lead line in a fourth direction, and the drive circuit, where the connection area is the position where the lead line is electrically connected with a touch electrode, and the fourth direction is the direction from a connection area of the non-rectangular touch electrode and a lead line to the first symmetry axis, and parallel to the second direction, so that such a problem can be avoided that the non-rectangular touch electrode can not be electrically connected with the lead lines, and thus can not operate normally, thus improving the precision of a touch on the touch display panel.

Figure 8:
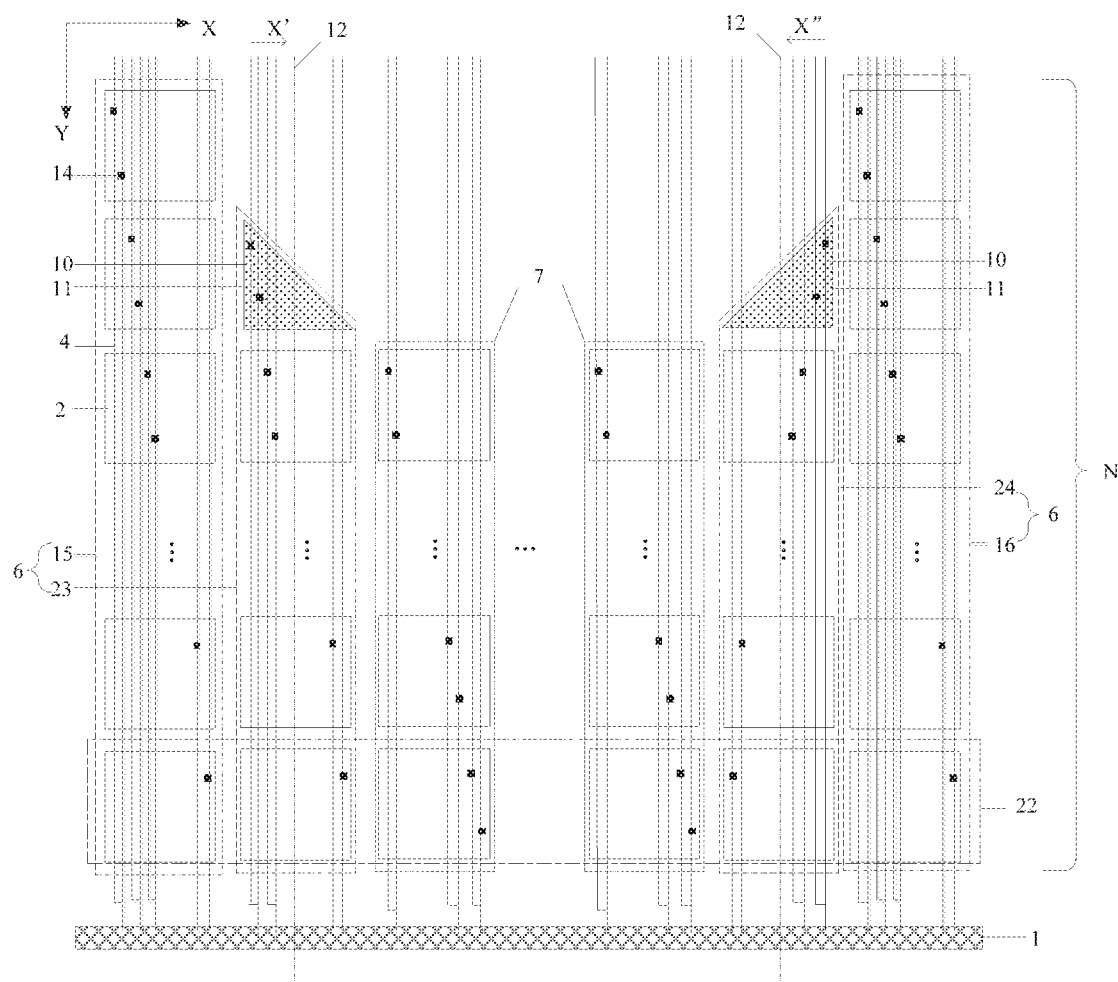
FIG. 8 is a schematic diagram of another touch display panel according to an embodiment of the application.

In one embodiment, a further touch display panel according to an embodiment of the application is as illustrated in FIG. 8 which is a schematic diagram of the touch display panel according to the embodiment of the application including non-rectangular touch electrodes, and the touch display panel includes the first column of touch electrode column 15 to the last column of touch electrode column 16 arranged in sequence in a second direction X, where the first column of touch electrode column 15, the second column of touch electrode column 23, the last column of touch electrode column 16, and the second last column of touch electrode column 24 are the first touch electrode column 6, the touch electrode columns between the second column of touch electrode column 23, and the second last column of touch electrode column 24 are the second touch electrode columns 7, and the second column of touch electrode column 23 and the second last column of touch electrode column 24 each includes a non-rectangular touch electrode 12, and the quantity of touch electrodes in each of the second column of touch electrode column 23, and the second last column of touch electrode column 24 is less than the quantity of touch electrodes in each of the first touch electrode column 15, and the last column of touch electrode column 16 by one, where the first side of the non-rectangular touch electrode 12 in the second column of touch electrode column 23 is the right-angled side 11, and the connection area 14 of the lead lines 14 is located on the left side of the first symmetry axis 12, so the fourth direction X' of the second column of touch electrode column 23 is direction from the left to the right. For any one lead line 4 connected with the second column of touch electrode column 23, a lead line 4 adjacent to the any one lead line 4 in the fourth direction X' is a lead line 4 on the right side of the any one lead line 4, and the distance between the connection area 14 of any other lead line 4 than the lead lines 4 connected with the last touch electrode 2, and the drive circuit 1 is longer than the distance between the connection area 14 of the lead line 4 on the right side of the any one lead line 4, and the drive circuit 1. For the non-rectangular touch electrode 12 in the second last column of touch electrode column 24, the connection area 14 of the lead lines 4 thereof is located on the right side of the first symmetry axis 12, so the fourth direction X" of the last column of touch electrode column 16 is the direction from the right to the left. For any one lead line 4 connected with the second last column of touch electrode column 24, a lead line 4 adjacent to the any one lead line 4 in the fourth direction X" is a lead line 4 on the left side of the any one lead line 4, and the distance between the connection area 14 of any other lead line 4 than the lead lines 4 connected with the last touch electrode 2, and the drive circuit 1 is longer than the distance between the connection area 14 of the lead line on the left side of the any one lead line 4, and the drive circuit 1.

Figure 9:
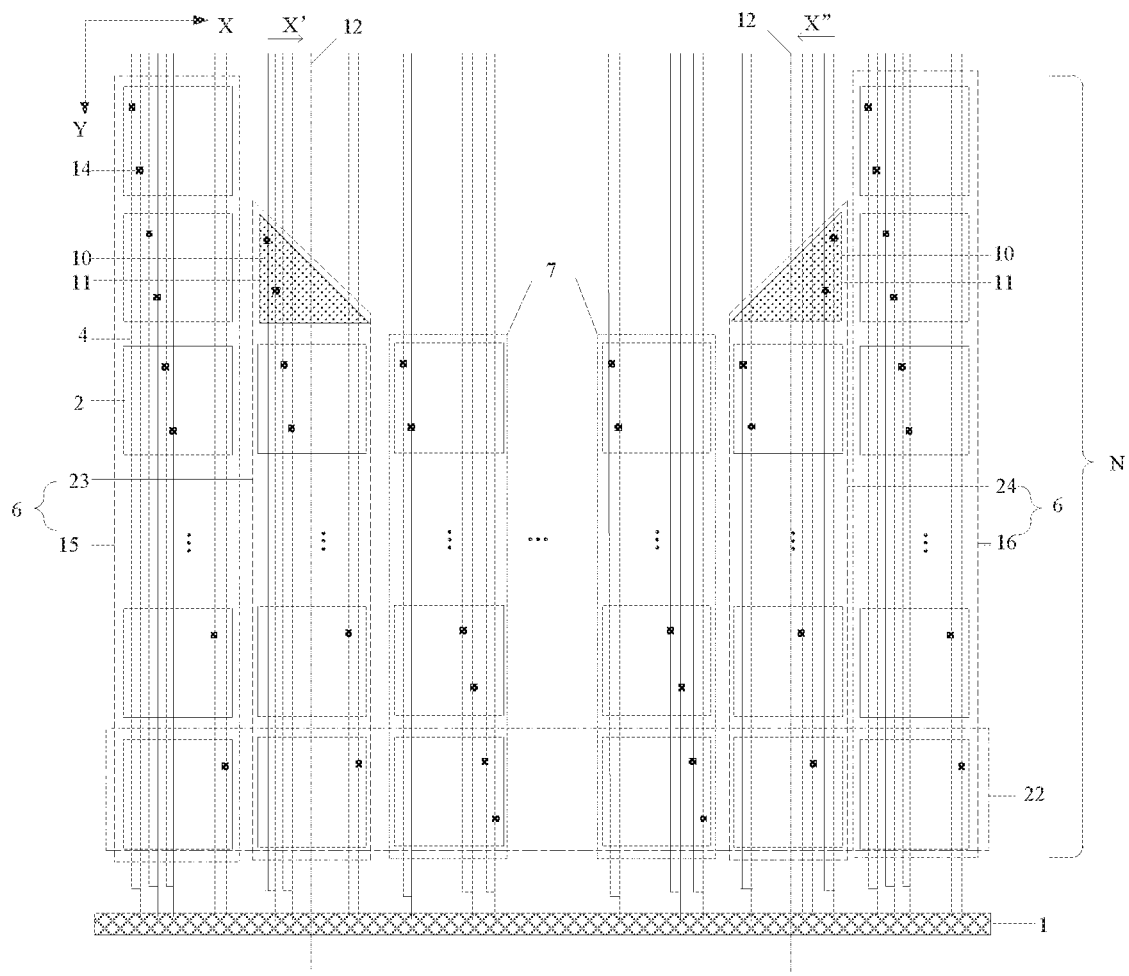
FIG. 9 is a schematic diagram of another touch display panel according to an embodiment of the application.

The lead lines 4 of the second last column of touch electrode column 24 in FIG. 8 can be arranged as illustrated in FIG. 9 which is a schematic diagram of another touch display panel according to an embodiment of the application including non-rectangular touch electrodes, where lead lines 4 connected with a non-rectangular touch electrode are still arranged from the left to the right, and connected in sequence with the first rectangular touch electrode to the last rectangular touch electrode in the column direction; and the first side of the non-rectangular touch electrode 10 is the right-angled side 11, and the connection area 14 of the non-rectangular touch electrode 10 is arranged in such an area between the right-angled side 11 and the first symmetry axis 12 that the non-rectangular touch electrode 10 is connected with the lead lines 4 in a sufficient area so that the non-rectangular touch electrode 10 can operate normally.

In the touch display panel as illustrated in FIG. 8 and FIG. 9 according to the embodiment of the application, the lead lines are arranged uniformly among the pixel element columns, and the touch electrode columns, and the connection area 14 of the non-rectangular touch electrode 10 is arranged in the area between the first side thereof, and the first symmetry axis 12 thereof, so that the area of the non-rectangular touch electrode can be made full use of for the non-rectangular touch electrode to be connected with the lead lines, and the non-rectangular touch electrode 14 can be connected with the lead lines 4 without arranging any additional lead lines 4 so that the non-rectangular touch electrode 10 can operate normally, thus further improving the precision of a touch on the touch display panel while improving the uniformity and the effect of displaying on the touch display panel, and reducing the difference in interference of the signals, transmitted on the lead lines, to the different touch electrode columns.

It shall be noted that in FIG. 8 and FIG. 9, when a touch electrode 2 is connected with two leads 4, there are different distances between the connection areas 14 of the different lead lines 4, and the drive circuit 1, for example. In one embodiment, the distances between the connection areas 14 of the lead lines 4 connected with the same touch electrode 2, and the drive circuit 1 may be the same, and alike the non-rectangular touch electrode 10 can operate normally. FIG. 8 and FIG. 9 only schematically illustrate the touch electrodes 2 connected with the drive circuit 1 through the lead lines 4, and although the arrangement pattern of the lead lines 4 connected with the touch electrodes 2 in the second column of touch electrode column 23 is different from the arrangement pattern of the lead lines 4 connected with the touch electrodes 2 in the second last column of touch electrode column 24, the touch electrodes 2 shall be electrically connected with the drive circuit 1 through the lead lines 4 in such a way that touch electrodes 2 in each touch electrode column are driven using a drive signal provided by the drive circuit 1 in the same order. When the array of touch electrodes includes the first touch electrode column to the N-th touch electrode column arranged in sequence in the direction parallel to the first direction Y. and away from the drive circuit 1, the drive circuit 1 shall drive the touch electrodes in the array in the order from the N-th row of touch electrodes to the first row of touch electrodes, or drive the touch electrodes in the array in the order from the first row of touch electrodes to the N-th row of touch electrodes. Moreover a touch electrode column in FIG. 8 and FIG. 9 includes only one non-rectangular touch electrode 10, but in another implementation of the embodiment of the application, a touch electrode column may include non-rectangular touch electrodes. In the case that a coverage area of a positive projection of a non-rectangular touch electrode onto the first plane is very small, the quantity of lead lines connected with each touch electrode in a touch electrode column including the non-rectangular touch electrode shall be adjusted dependent upon a real condition, and the non-rectangular touch electrode may be designed to be electrically connected with only one lead line.

In the respective touch display panels as illustrated in FIG. 1, FIG. 3, FIG. 8, and FIG. 9 according to the embodiments of the application, the plurality of touch electrode columns include the first touch electrode column, and the second touch electrode column as described above by way of an example, but in another embodiment of the application, the touch electrode columns can further include at least one third touch electrode column, and the quantity of touch electrodes in the third touch electrode column is less than the quantity of touch electrodes in the second touch electrode column, where the quantity of lead lines electrically connected with each touch electrode in the third touch electrode column is the same as the quantity of lead lines electrically connected with each touch electrode in the second touch electrode column.

Figure 10:
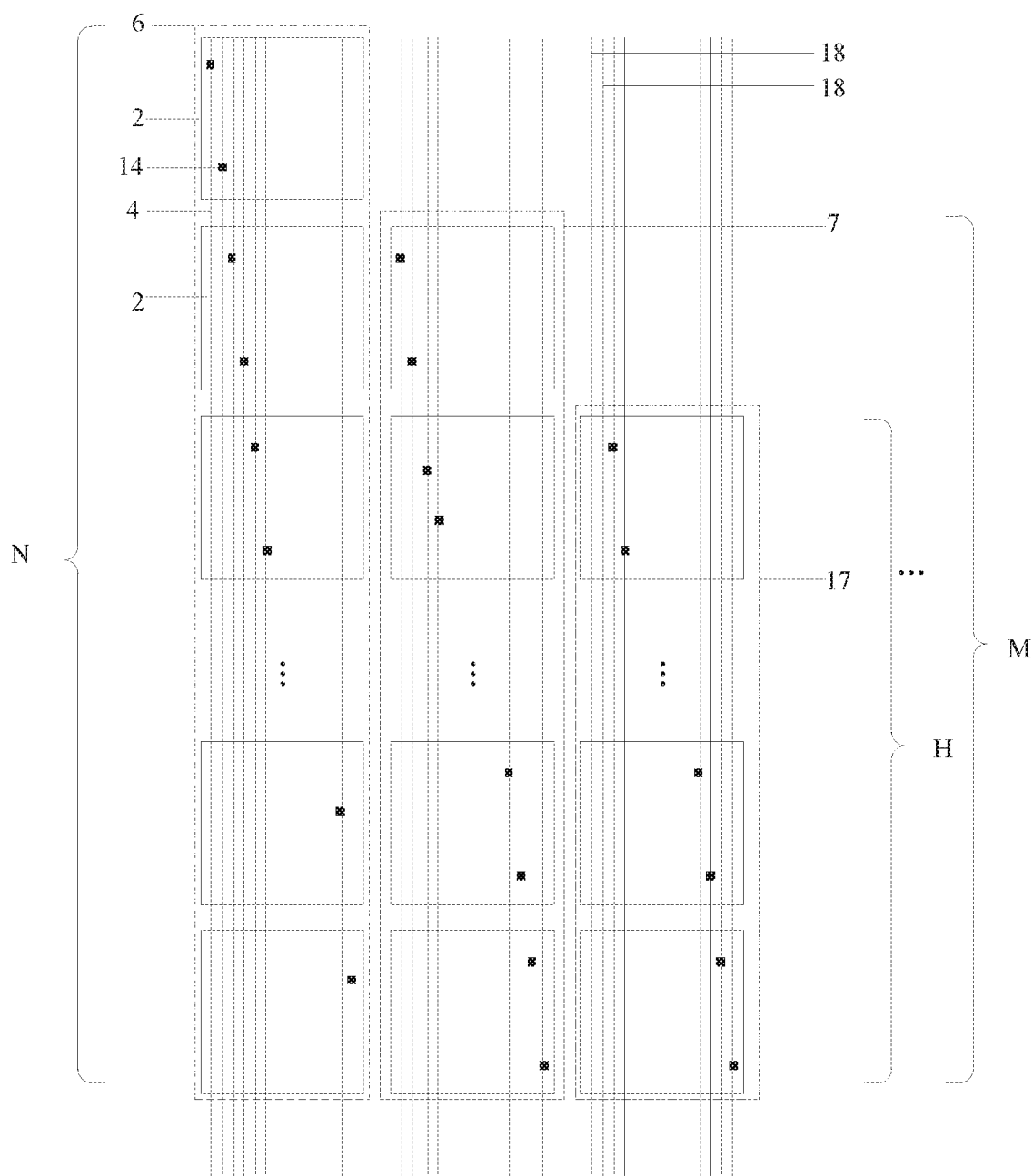
FIG. 10 is a schematic diagram of another touch display panel according to an embodiment of the application.
Figure 11:
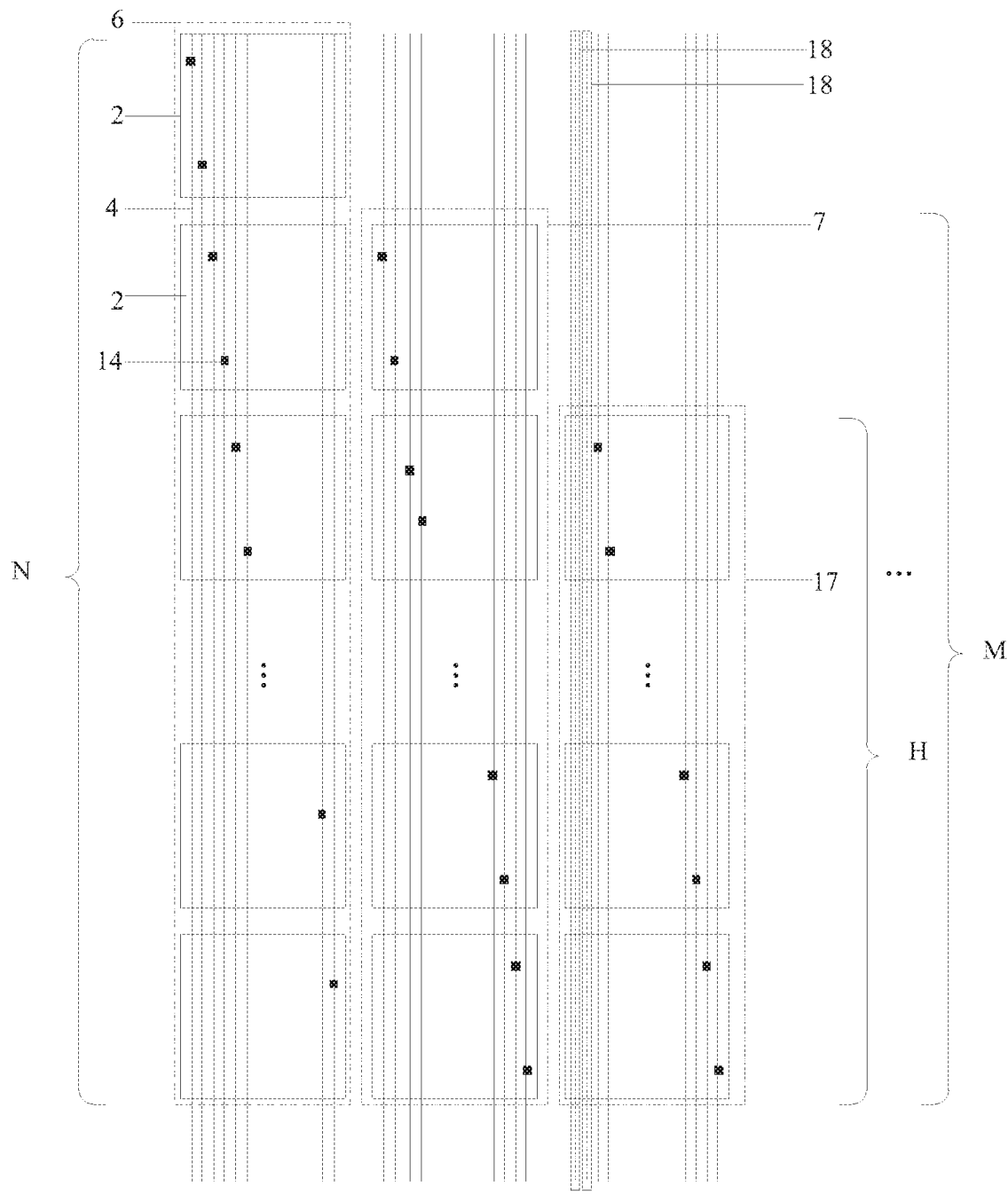
FIG. 11 is a schematic diagram of another touch display panel according to an embodiment of the application.

In one embodiment, a further touch display panel according to an embodiment of the application is as illustrated in FIG. 10 which is a schematic diagram of the touch display panel according to the embodiment of the application including a third touch electrode column, and the touch display panel includes a first touch electrode column 6, a second touch electrode column 7, and a third touch electrode column 17, where each touch electrode in the second touch electrode column 7 is electrically connected with two lead lines 4, the respective lead lines 4 covered by a positive projection of the second touch electrode column 7 onto the first plane 1 are electrically connected with the touch electrodes 2 in the second touch electrode column 7, each touch electrode 2 in the third touch electrode column 17 is electrically connected with two lead lines 4, and the third touch electrode column 17 includes one less touch electrode 2 than the second touch electrode column 7, so that the total quantity of lead lines 4 connected with the touch electrodes 2 in the third touch electrode column 17 is less than the total quantity of lead lines 4 connected with the touch electrodes 2 in the second touch electrode column 7, and the lead lines covered in an area covered by a positive projection of the third touch electrode column 17 onto the first plane include two dummy lines 18, so that the lead lines can be avoided from being distributed non-uniformly, which would otherwise result in that an image is not displayed uniformly. In order to arrange the dummy lines, each dummy line may be an integral wire as illustrated in FIG. 10, or can be as illustrated in FIG. 11 which is a schematic diagram of another touch display panel according to an embodiment of the application including a third touch electrode column, where a dummy line 18 includes wires coinciding in the first direction, and disconnected from each other, and since the plurality of disconnected wires coincide in the first direction, the disconnected wires still can be regarded as a lead line in the first direction. As compared with FIG. 10, the arrangement pattern of the dummy lines can further avoid electrostatic charges from being accumulated in the touch display panel. In one embodiment, the touch electrodes are an array in the first direction Y and the second direction X, where the column direction is the first direction Y, and the row direction is the second direction X. The touch electrodes include the first touch electrode row to the N-th touch electrode row arranged in sequence in the direction parallel to the first direction Y, and away from the drive circuit 1, where the touch electrode in the second touch electrode column 7 are only located in the M-th row of touch electrode row, and the touch electrodes in the third touch electrode column 17 are only located in the H-th row of touch electrode row, where H<M<N. The second touch electrode column includes both touch electrodes located in the first touch electrode row to the H-th touch electrode row, and touch electrodes located in the (H+1)-th touch electrode row to the M-th touch electrode row. The first touch electrode column 6 includes both touch electrodes located in the first touch electrode row to the M-th touch electrode row; and at least touch electrodes located in the (M+1)-th touch electrode row to the N-th touch electrode row, that is, all the touch electrodes in the (M+1)-th touch electrode row to the N-th touch electrode row are touch electrodes in the first touch electrode column 6.

In the touch display panel according to the embodiment of the application including a third touch electrode column, the quantity of touch electrodes in the third touch electrode column is less than the quantity of touch electrodes in the second touch electrode column, and the quantity of touch electrodes in the second touch electrode column is less than the quantity of touch electrodes in the first touch electrode column. The length, of an area covered by a positive projection of the third touch electrode column onto the first plane, in the column direction is less than the length, of an area covered by a positive projection of the second touch electrode column onto the first plane, in the column direction, and the length, of the area covered by the positive projection of the second touch electrode column onto the first plane, in the column direction is less than the length, of an area covered by a positive projection of the first touch electrode column onto the first plane, in the column direction. An area in which no touch electrodes are arranged exists in an area in which a row of touch electrodes intersects with the second touch electrode column, and the third touch electrode column extending in the column direction, and a camera or another element can be arranged in the area, in which no touch electrodes are arranged, corresponding to the second touch electrode column, and/or the third touch electrode column. At least one third touch electrode column can be arranged between two second touch electrode columns, or can be arranged between a first touch electrode column, and a second touch electrode column. The quantities and positions of the first touch electrode columns, the second touch electrode columns, and the third touch electrode columns can be set dependent upon a real condition to thereby provide more options for setting the shape of a display area of the touch display panel on which an image is displayed in an abnormal shape. In the case that the lead lines are distributed uniformly among the pixel element columns and the touch electrode columns, the respective lead lines covered by the positive projection of the second touch electrode column onto the first plane are electrically connected with the touch electrodes in the second touch electrode column, and each touch electrode in the second touch electrode column are electrically connected with the same quantity of lead lines, the quantity of lead lines electrically connected with each touch electrode in the third touch electrode column is the same as the quantity of lead lines electrically connected with each touch electrode in the second touch electrode column, that is, each touch electrode in the third touch electrode column is connected with the same quantity of lead lines, so that in the stage of providing the touch electrodes with touch signals through the lead lines, the difference of signals transmitted on the lead lines arising from the difference in the quantity of the lead lines connected with the touch electrodes in the touch electrode column cam be avoided to thereby further improve the uniformity of the precision of a touch on the touch display panel while making a normal touch on the touch electrodes, and guaranteeing the uniformity of displaying on the touch display panel.

Figure 12:
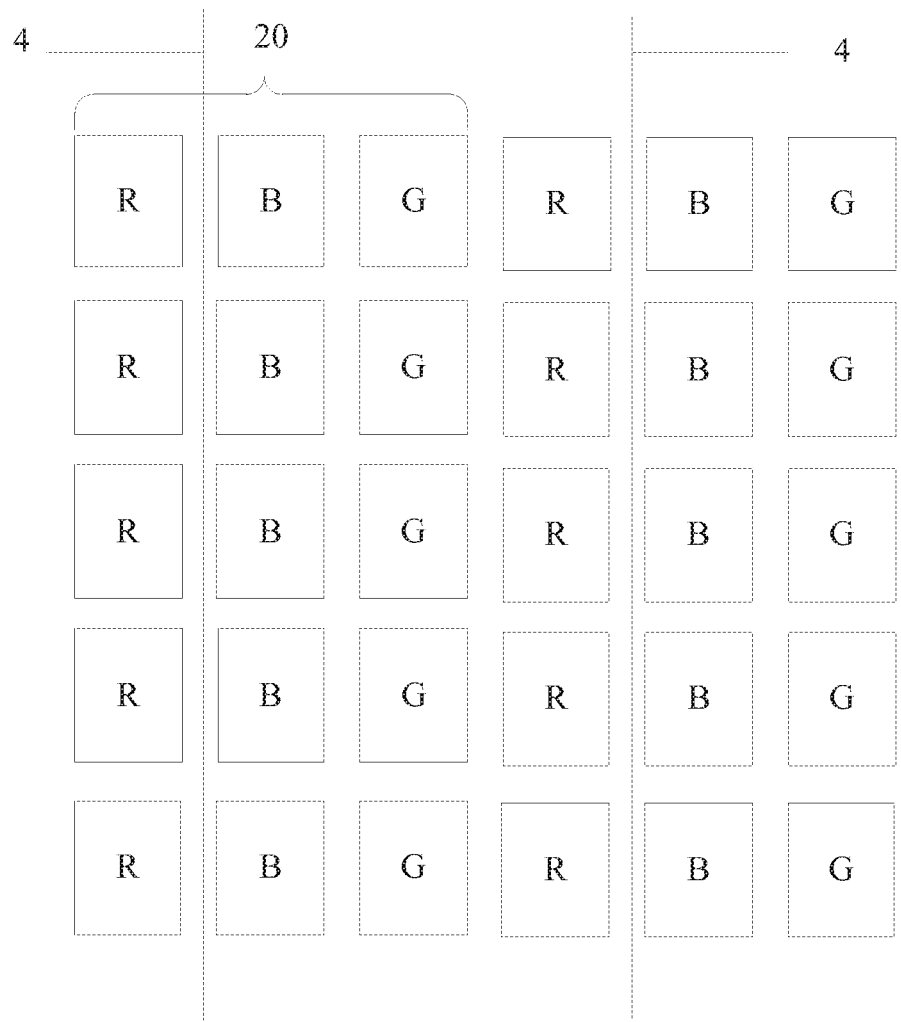
FIG. 12 is a schematic diagram of the positional relationship between positive projections of lead lines onto a first plane, and positive projections of sub-pixels onto the first plane in a display panel according to an embodiment of the application.

In any one of the embodiments above of the application, in one embodiment as illustrated in FIG. 12 which is a schematic diagram of the positional relationship between the positive projections of the lead lines onto the first plane, and positive projections of sub-pixels onto the first plane, each pixel element 20 includes a red sub-pixel R, a blue sub-pixel B, and a green sub-pixel G. In the touch display panel according to the embodiment of the application, a data line is arranged between two adjacent sub-pixels in the first direction, each of the lead lines 4 is arranged at the same layer, and the positive projections of the lead lines 4 onto the first plane lie into positive projections of the data lines onto the first plane. In FIG. 12, the positive projection of a lead line 4 onto the first plane lies into between two adjacent sub-pixels in a pixel element 20, or of course, a lead line 4 can lie into between two adjacent pixel elements 20. In FIG. 12, each pixel element 20 corresponds to one of the lead lines 4, a pixel element 20 operates as a light-emitting element, and each pixel element 20 corresponds to one of the lead lines 4, so that there will be a uniform opening ratio of each pixel element 20 to thereby improve the uniformity of displaying, and the opening ratio and the transmittivity of a pixel element can be improved in the touch display panel according to the embodiment of the application compared with a pixel element corresponding to lead lines.

Of course, in another embodiment of the application, a pixel element may include only one sub-pixel, e.g., any one of a red sub-pixel, a blue sub-pixel, and a green sub-pixel.

A display device according to an embodiment of the application includes a touch display panel according to an embodiment of the application.

The display device according to the embodiment of the application can be a mobile phone, a tablet computer, a TV set, or another display device, for example.

In summary, in the touch display panel and the display device according to the embodiments of the application, the quantity of touch electrodes in a first touch electrode column is more than the quantity of touch electrodes in a second touch electrode column, and the length, of the area covered by the positive projection of the first touch electrode column onto the first plane, in the column direction is more than the length, of the area covered by the positive projection of the second touch electrode column onto the first plane, in the column direction, that is, the touch display panel according to the embodiment of the application is a touch display panel on which an image is displayed in an abnormal shape, so that a camera or another element can be arranged without hindering an image from being displayed throughout a screen of the touch display panel. The quantity of lead lines is the same as the quantity of pixel element columns, and the lead lines are arranged uniformly in the area covered by the positive projection onto the first plane, that is, in the touch display panel according to the embodiment of the application on which an image is displayed in an abnormal shape, the lead lines are distributed uniformly among the pixel elements in the array of pixel elements in the touch display panel, each pixel element column corresponds to one of the lead lines, a pixel element operates as a light-emitting element, and each pixel element corresponds to one of the lead lines, so there will be a uniform opening ratio of each pixel element to thereby improve the uniformity of displaying, and the opening ratio and the transmittivity of a pixel element can be improved in the touch display panel according to the embodiment of the application compared with a pixel element corresponding to lead lines. Each touch electrode is electrically connected with the drive circuit through at least one of the lead lines so that in the case that the precision of a touch on the touch display panel is guaranteed, the lead lines can be arranged uniformly in the touch display panel on which an image is displayed in an abnormal shape, so that an image can be displayed uniformly to thereby improve the effect of displaying, and the experience of a user. For the touch display panel on which an image is displayed in an abnormal shape, in the case that the lead lines are arranged uniformly in the area covered by the positive projection onto the first plane, the positive projection of each touch electrode column onto the first plane covers the same quantity of lead lines, so that the lead lines are distributed uniformly among the respective touch electrode columns. The total quantity of lead lines electrically connected with touch electrodes in each first touch electrode column is equal to the total quantity of lead lines electrically connected with touch electrodes in each second touch electrode column, so that in a touch stage, in a display stage in the case that the common electrode is reused as the touch electrodes, or in another stage in which signals are provided through the lead lines, each touch electrode column is subjected to the same interference of signals on the lead lines, thus further reducing the difference in interference, of the signals transmitted on the lead lines, to the different touch electrode columns while improving the uniformity and the effect of displaying on the touch display panel. The arrangement patterns of the touch electrodes and the lead lines according to the embodiment of the application can be applicable to a touch display panel on which an image is displayed in an abnormal shape in a display area in any shape, so the touch display panel can be widely applied, and easy to fabricate. In the touch display panel according to the embodiment of the application, the quantity of lead lines connected with a touch electrode proximate to the drive circuit is less than the quantity of lead lines connected with a touch electrode away from the drive circuit, so that the ratio of the largest one of the resistances of the lead lines connected with the touch electrodes in the touch display panel to the smallest one of the resistances of the lead lines connected with the touch electrodes can be reduced to thereby reduce the difference in impedance between the different touch electrodes so as to further improve the precision of a touch on the touch display panel. In the touch display panel according to the embodiment of the application, when two adjacent touch electrode columns include different numbers of touch electrodes, a non-rectangular touch electrode can be arranged in a touch electrode column for the purpose of the transition of a pattern of the touch electrodes to thereby make full use of a display area and a touch area so as to further improve the precision of a touch on the touch display panel. In the touch display panel according to the embodiment of the application, the connection area of the non-rectangular touch electrode can be arranged between the first side thereof, and the first symmetry axis thereof, so that the non-rectangular touch electrode can be connected with the lead lines without arranging any additional lead lines, and in this way, the non-rectangular touch electrode can operate normally.

The invention claimed is:

1. A touch display panel, comprising:
   a drive circuit, pixel elements arranged in an array, touch electrodes arranged in an array, and a plurality of lead lines extending in a first direction, and arranged in a second direction, wherein each of the touch electrodes is electrically connected with the drive circuit through at least one of the lead lines;
   the pixel elements arranged in the array comprise a plurality of pixel element columns, the touch electrodes arranged in the array comprise a plurality of touch electrode columns, and both a column direction of the pixel element columns, and a column direction of the touch electrode columns are the first direction;
   a quantity of lead lines is the same as a quantity of pixel element columns, and the lead lines are arranged uniformly in an area covered by a positive projection onto a first plane;
   a positive projection of each of the touch electrode columns onto the first plane covers a same quantity of lead lines;
   the plurality of touch electrode columns comprise at least one first touch electrode column, and at least one second touch electrode column, and a quantity of touch electrodes in the first touch electrode column is more than a quantity of touch electrodes in the second touch electrode column; and a total quantity of lead lines electrically connected with the touch electrodes in each of the first touch electrode columns is equal to a total quantity of lead lines electrically connected with the touch electrodes in each of the second touch electrode columns; and
   wherein the first direction intersects with the second direction, and the first plane is a plane where the touch display panel lies.

2. The touch display panel according to claim 1, wherein each of the lead lines covered by a positive projection of the second touch electrode column onto the first plane is electrically connected with at least one of the touch electrodes in the second touch electrode column.

3. The touch display panel according to claim 2, wherein at least one of the touch electrodes in the first touch electrode column is electrically connected with a different quantity of lead lines from the quantities of lead lines electrically connected with the other touch electrodes in the first touch electrode column; and
   each touch electrode in the second touch electrode column is electrically connected with a same quantity of lead lines.

4. The touch display panel according to claim 3, wherein the largest quantity of lead lines electrically connected with any one of the touch electrodes in the first touch electrode column is equal to the quantity of lead lines electrically connected with each touch electrode in the second touch electrode column.

5. The touch display panel according to claim 4, wherein the first touch electrode column comprises first type of touch electrodes, and second type of touch electrodes, the quantity of lead lines electrically connected with each of the first type of touch electrodes is less than the quantity of lead lines electrically connected with each of the second type of touch electrodes, and the quantity of lead lines electrically connected with each of second type of touch electrodes is the same as the quantity of lead lines electrically connected with each touch electrode in the second touch electrode column; and
   the first type of touch electrodes are closer to the drive circuit than the second type of touch electrodes in an extension direction of the lead lines.

6. The touch display panel according to claim 5, wherein each of the first type of touch electrodes is electrically connected with the same quantity of lead lines.

7. The touch display panel according to claim 6, wherein the quantity of lead lines connected with each of the first type of touch electrodes is less than the quantity of lead lines connected with each of the second type of touch electrodes by one.

8. The touch display panel according to claim 6, wherein each of the first type of touch electrodes is connected with one of the lead lines.

9. The touch display panel according to claim 7, wherein each of the first type of touch electrodes is connected with one of the lead lines.

10. The touch display panel according to claim 5, wherein the quantity of lead lines connected with a first type of touch electrode in the same first touch electrode column is not more than the quantity of lead lines connected with another first type of touch electrode adjacent to said first type of touch electrode on a side away from the drive circuit.

11. The touch display panel according to claim 5, wherein the lead lines connected with the first type of touch electrode in the same first touch electrode column are arranged between the lead lines connected with the second type of touch electrode in the touch electrode column.

12. The touch display panel according to claim 5, wherein the first type of touch electrode, adjacent to the drive circuit in the first direction, in at least one of the first touch electrode columns is a non-rectangular touch electrode.

13. The touch display panel according to claim 5, wherein at least one of the touch electrode columns comprises rectangular touch electrodes and a non-rectangular touch electrode, and the non-rectangular touch electrode is farther from the drive circuit in the first direction than the rectangular touch electrodes.

14. The touch display panel according to claim 12, wherein:
    the touch electrodes comprise first sides parallel to the first direction, and the first sides of the touch electrodes in the same touch electrode column lie on the same straight line; and the first side of the non-rectangular touch electrode is of the largest length of the non-rectangular touch electrode in the first direction, and a length of the non-rectangular touch electrode in the first direction decreases progressively along a third direction, the third direction being the direction parallel to the second direction, and pointed from the first side to a first symmetry axis, wherein the first symmetry axis is a symmetry axis about which the rectangular touch electrodes in the same touch electrode column as the non-rectangular touch electrode extend in the first direction.

15. The touch display panel according to claim 14, wherein when the touch electrode column comprises a non-rectangular touch electrode, among the lead lines electrically connected with the touch electrodes in the touch electrode column, a distance between a connection area of any one of the lead lines, and the drive circuit is not shorter than a distance between a connection area of a lead line adjacent to the any other lead line in a fourth direction, and the drive circuit, wherein the connection area is a position where the lead line is electrically connected with the touch electrode, and the fourth direction is a direction from the connection area of the non-rectangular touch electrode and the lead line to the first symmetry axis, and parallel to the second direction.

16. The touch display panel according to claim 13, wherein:

the touch electrodes comprise first sides parallel to the first direction, and the first sides of the touch electrodes in the same touch electrode column lie on the same straight line; and the first side of the non-rectangular touch electrode is of the largest length of the non-rectangular touch electrode in the first direction, and a length of the non-rectangular touch electrode in the first direction decreases progressively along a third direction, the third direction being the direction parallel to the second direction, and pointed from the first side to a first symmetry axis, wherein the first symmetry axis is a symmetry axis about which the rectangular touch electrodes in the same touch electrode column as the non-rectangular touch electrode extend in the first direction.

17. The touch display panel according to claim 16, wherein when the touch electrode column comprises a non-rectangular touch electrode, among the lead lines electrically connected with the touch electrodes in the touch electrode column, a distance between a connection area of any one of the lead lines, and the drive circuit is not shorter than a distance between a connection area of a lead line adjacent to the any other lead line in a fourth direction, and the drive circuit, wherein the connection area is a position where the lead line is electrically connected with the touch electrode, and the fourth direction is a direction from the connection area of the non-rectangular touch electrode and the lead line to the first symmetry axis, and parallel to the second direction.

18. The touch display panel according to claim 3, wherein the touch electrode columns comprise at least one third touch electrode column, and a quantity of touch electrodes in the third touch electrode column is less than the quantity of touch electrodes in the second touch electrode column, wherein the quantity of lead lines electrically connected with each touch electrode in the third touch electrode column is the same as the quantity of lead lines electrically connected with each touch electrode in the second touch electrode column.

19. The touch display panel according to claim 1, wherein each of the pixel elements comprises a red sub-pixel, a blue sub-pixel, and a green sub-pixel.

20. A display device, comprising:

a touch display panel comprising:

a drive circuit, pixel elements arranged in an array, touch electrodes arranged in an array, and a plurality of lead lines extending in a first direction, and arranged in a second direction, wherein each of the touch electrodes is electrically connected with the drive circuit through at least one of the lead lines;

the pixel elements arranged in the array comprise a plurality of pixel element columns, the touch electrodes arranged in the array comprise a plurality of touch electrode columns, and both a column direction of the pixel element columns, and a column direction of the touch electrode columns are the first direction;

a quantity of lead lines is the same as a quantity of pixel element columns, and the lead lines are arranged uniformly in an area covered by a positive projection onto a first plane;

a positive projection of each of the touch electrode columns onto the first plane covers a same quantity of lead lines;

the plurality of touch electrode columns comprise at least one first touch electrode column, and at least one second touch electrode column, and a quantity of touch electrodes in the first touch electrode column is more than a quantity of touch electrodes in the second touch electrode column; and a total quantity of lead lines electrically connected with the touch electrodes in each of the first touch electrode columns is equal to a total quantity of lead lines electrically connected with the touch electrodes in each of the second touch electrode columns; and wherein the first direction intersects with the second direction, and the first plane is a plane where the touch display panel lies.

\* \* \* \* \*